US012768468B2

(12) United States Patent
Osako et al.

(10) Patent No.: US 12,768,468 B2
(45) Date of Patent: Oct. 20, 2026

(54) SOLENOID VALVE MONITOR USING HALL EFFECT SENSORS

(71) Applicant: Beckman Coulter, Inc., Brea, CA (US)

(72) Inventors: Masayuki Osako, Shizuoka Prefecture (JP); Noriyuki Ito, Shizuoka Prefecture (JP)

(73) Assignee: Beckman Coulter, Inc., Brea, CA (US)

( * ) Notice: Subject to any disclaimer, the term of this patent is extended or adjusted under 35 U.S.C. 154(b) by 59 days.

(21) Appl. No.: 18/697,864

(22) PCT Filed: Oct. 13, 2022

(86) PCT No.: PCT/US2022/078014
§ 371 (c)(1),
(2) Date: Apr. 2, 2024

(87) PCT Pub. No.: WO2023/076806
PCT Pub. Date: May 4, 2023

(65) Prior Publication Data

US 2025/0003524 A1 Jan. 2, 2025

Related U.S. Application Data

(60) Provisional application No. 63/271,609, filed on Oct. 25, 2021.

(51) Int. Cl.
*F16K 37/00* (2006.01)
*G01N 35/00* (2006.01)

(52) U.S. Cl.
CPC ... *F16K 37/0083* (2013.01); *G01N 35/00623* (2013.01)

(58) Field of Classification Search
CPC ............ F16K 37/0083; F16K 31/0675; F16K 37/0033; F16K 31/0655; G01N 35/00623;
(Continued)

(56) References Cited

U.S. PATENT DOCUMENTS 11,761,462 B2 * 9/2023 Weickel ............. F16K 37/0083 73/40
2016/0122808 A1 5/2016 Ammann et al.
(Continued)

FOREIGN PATENT DOCUMENTS

DE 102018008846 A1 5/2020
DE 102018219580 A1 5/2020
(Continued)

OTHER PUBLICATIONS

International Search Report and Written Opinion for PCT/US22/78014 mailed Feb. 2, 2023, 15 pages.

*Primary Examiner* — Akm Zakaria
(74) *Attorney, Agent, or Firm* — FBT Gibbons LLP

(57) ABSTRACT

Disclosed are systems and methods for detecting a malfunction in an automated analyzer. The systems and methods may include receiving a signal from a sensor (116), such as a Hall effect sensor located proximate a coil (104) of a solenoid valve (100). The signal from the sensor may be correlated to a magnetic flux or change in the magnetic flux generated as a plunger (102) of the solenoid valve is drawn into the coil when the coil is energized. Deviations in the signal from a reference may indicated a malfunction of the solenoid valve. Upon detecting a malfunction, a pre-failure status may be determined.

16 Claims, 21 Drawing Sheets

(58) Field of Classification Search
CPC ........ G01N 35/00712; H01F 2007/185; H01F 7/1844
See application file for complete search history.

(56) References Cited

U.S. PATENT DOCUMENTS

| | | | | |
|---|---|---|---|---|
| 2017/0261526 | A1* | 9/2017 | Calatzis | G01N 35/00623 |
| 2019/0094249 | A1* | 3/2019 | Klingauf | G01N 35/00623 |
| 2020/0355295 | A1* | 11/2020 | Flandin | G01M 13/003 |

FOREIGN PATENT DOCUMENTS

| | | | |
|---|---|---|---|
| JP | 2017/187169 | A | 10/2017 |
| JP | 2017/198246 | A | 11/2017 |

* cited by examiner

| Logic No | What can be Detected by this Logic? | Logic Name | Explanation | Threshold Example : 1 or more than 2 | | | Logic Image | Target Valve |
|---|---|---|---|---|---|---|---|---|
| | | | | Threshold 1 | Threshold 2 | Threshold 3 | | |
| 1 | This Logic can Detect Whether or not the Delay Between ON Signal Sending Timing to Valve and ON Motion Timing of Valve.<br>This Logic can Detect Whether or not the Diaphragm of the Valve Get Stuck and Causing Plunger Movement Blockage | Rising Delay | To be Judged by Time Difference Between Open ☒ Close Signals | >10msec | >50msec | >100msec | Fig 6 | Sample / Reagent Dispensing Valve |
| 2 | This Logic can be Used the Same Case of Illogic No.1, but it is Used Where Much Precise Control is Required. | On Period Check | Open Time of Close ☒ Open☒ Close to be Judged | < Normal Value | < Normal Value -α | < Normal Value -β | Fig 8 | Detergent Creation Valve<br>-Waste Valve<br>-Atmospheric Release Valve |
| 3 | This Logic can Detect Whether or not the Delay Between OFF Signal Sending Timing to Valve and OFF Motion Timing of Valve.<br>This Logic can Detect Whether or not the Diaphragm of the Valve Get Stuck and Causing Plunger Movement Blockage | Declining Delay | To be Judged by Time Difference Between Open ☒ Close Signals | >10msec | >50msec | >100msec | Fig 9 | Sample Inner Wash Valve |
| 4 | This Logic is Used to Detect Whether or not the Wave Form of ON is Stable Due to Deteriorations Caused by Changes of Magnetic Quantities at the Time Of Normal Solenoid Valve Operations | Maximum Value | To be Judged by the Largest Value of Close☒ Open☒ Close | < Normal Value | <0.7 x Normal Value | <0.5 x Normal Value | Fig 11 | Alternating Current Type Solenoid Valves(fig10) |

FIG. 22A

| Logic No | What can be Detected by this Logic? | Logic Name | Explanation | Threshold Example : 1 or more than 2 | | | Logic Image | Target Valve |
|---|---|---|---|---|---|---|---|---|
| | | | | Threshold 1 | Threshold 2 | Threshold 3 | | |
| 5 | This Logic is Used for the Same Case of Logic No.1 and No.3 But Used for the Valve Where the Time of ON is Not Stable. | Maximum Value (period Specified) | To Be Judged by the Maximum Value in Period Specified | < Normal Value | <0.7 x Normal Value | <0.5 x Normal Value | Fig 12 | Sample Inner Wash Valve (Fig7) |
| 6 | This Logic is Used to Detect Whether or not the Wave Form of ON is Stable Due to Deterioration Over Time. | Mean Value | To be Judged by Mean Value Between Close⊠ Open ⊠ Close | < Mean Value±5% | < Mean Value±10% | < Mean Value±15% | Fig 13 | Alternating Current Type Solenoid Valves(fig10) |
| 7 | This Logic is Used For the Same Case of Logic No.1 and No.3 But Used for the Valve Where the Time of ON is Not Stable. | Maximum Value (period Specified) | To be Judged by Mean Value of Period Specified | < Mean Value±5% | < Mean Value±10% | < Mean Value±15% | Fig 14 | Valve with Power Saving Circuit(Fig7) |
| 8 | This Logic can Detect Small Change of Valve. This is More Sensitive Way of the Valve Failure Detection. Using this Logic, Degradation of Valve Functionality can Be Detected. | Rising Integral | The Difference From Normal Value of Open⊠ Close to be Judged | < Normal Value±5% | < Normal Value±10% | < Normal Value±15% | Fig 15 | Sample Inner Wash Valve |
| 9 | This Logic can Detect Small Change of Valve. This is More Sensitive Way of the Valve Failure Detection. Using this Logic, Degradation of Valve Functionality can be Detected, | Declining Integral | The Difference from Normal Value of Close ⊠ Open to be Judged | < Normal Value±5% | < Normal Value±10% | < Normal Value±15% | Fig 16 | Sample Inner Wash Valve |

FIG. 22B

SOLENOID VALVE MONITOR USING HALL EFFECT SENSORS

CLAIM OF PRIORITY

This Application is a national stage application filed under 35 U.S.C. § 371 of International Application Serial Number PCT/US2022/078014, filed Oct. 13, 2022, which claims the benefit of priority of U.S. Provisional Application Ser. No. 63/271,609, filed Oct. 25, 2021, which is hereby incorporated by reference in its entirety.

FIELD OF THE DISCLOSURE

The present disclosure relates generally to solenoid valves and use thereof. More specifically, the present disclosure relates to using sensors to monitor solenoid valves and methods of use thereof for controlling automated analyzers or other devices using such valves.

BACKGROUND

An assay is an analytical procedure for qualitatively assessing or measuring a property of an analyte. The analyte can be a chemical substance, a cell in an organism or other organic sample. The perform the assay, the analyte is placed in an automated analyzer. The automated analyzer includes instrumentation to measure the property in question.

SUMMARY

Disclosed are systems and methods for detecting a malfunction in an automated analyzer. The systems and methods may include receiving a signal from a sensor, such as a Hall effect sensor located proximate a coil of a solenoid valve. The signal from the sensor may be correlated to a magnetic flux or change in the magnetic flux generated as a plunger of the solenoid valve is drawn into the coil when the coil is energized. Deviations in the signal from a reference may indicated a malfunction of the solenoid valve. Upon detecting a malfunction, a pre-failure status may be determined.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIGS. 22A-22B show a table setting forth a number of judgment logics which may be used to judge abnormalities of a solenoid valve.

Corresponding reference characters indicate corresponding parts throughout the several views. The exemplifications set out herein illustrate exemplary embodiments of the disclosure, and such exemplifications are not to be construed as limiting the scope of the disclosure any manner.

DETAILED DESCRIPTION

Solenoid valves are used as fluid switching components on automated analyzers used in clinical or other chemistry systems. Currently, automated analyzers do not include systems or methods to monitor the function of the solenoid valve and/or control the automated analyzer based on the function of the solenoid valve. Thus, when a valve malfunction occurs, fluid system errors may not be recognized by the systems. This lack of malfunction recognition may increase a potential risk for error generations on dispensing, washing, and other functions of the automated analyzer due to valve malfunctions.

Currently, it is difficult to identify defective or otherwise detect a malfunctioning valve from the several valves that may be used in assay systems. Consequently, substantial resources in at least the amount of time for field service engineers may be consumed to identify such defective valves when repairing the systems. This may result in prolonged downtime to users. In addition, defective valves may lead to sample spoilage or other errors associated with testing to be performed by using the automated analyzer.

As disclosed herein, sensors, such as Hall effect sensors may be located proximate a coil of a solenoid valve. The sensor may detect a magnetic flux and/or a change in a magnetic flux and/or field when the coil is energized and a plunger of the solenoid valve is drawn into the coil. Deviations and/or changes from a known magnetic flux and/or field may be detected using one or more logics as disclosed herein. When the deviations and/or changes are greater than a threshold, a pre-failure status may be determined.

A pre-failure status may be indication that a value is functioning in a manner that indicates a failure may occur in the near future. Stated another way, the pre-failure status may indicate that a valve is approaching to a failure mode, but still working as expected. Therefore, remedial action may be needed to avoid a failure of the value during use. For example, a pre-failure status may indicate that a valve needs to be replaced or otherwise serviced within X days or Y hours of operation to avoid potential failure of the value during assay procedures.

The above discussion is intended to provide an overview of subject matter of the present patent application. It is not intended to provide an exclusive or exhaustive explanation of the invention. The description below is included to provide further information about the present patent application.

Figure 1A:
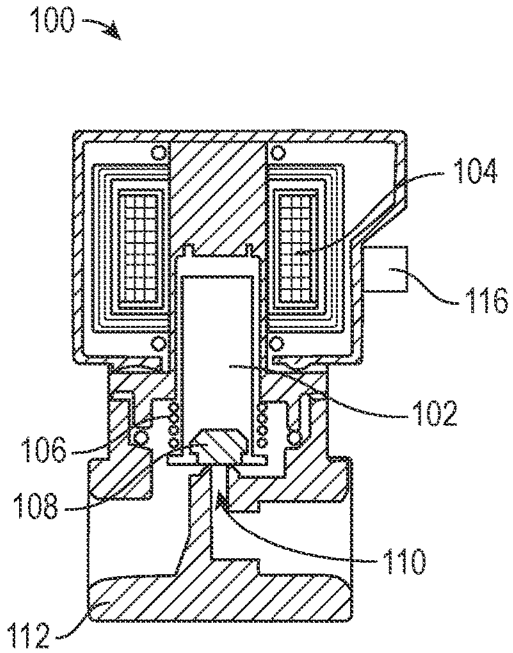
FIGS. 1A, 1B, 1C, and 1D each shows an example schematic of a solenoid valve consistent with at least one embodiment of this disclosure.
Figure 1B:
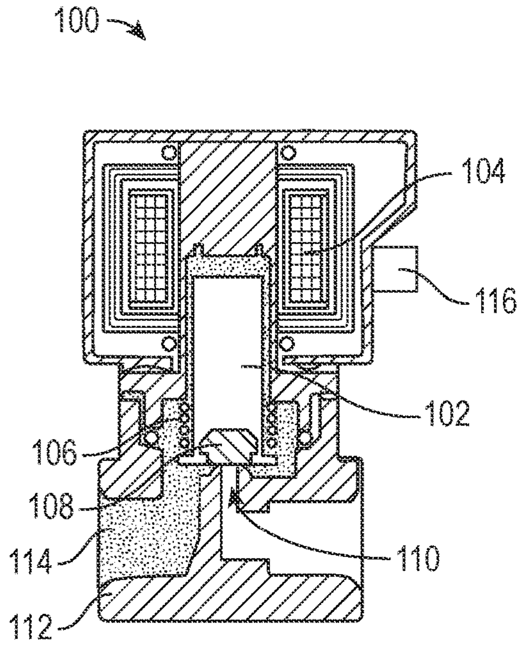

Turning now to the figures, FIGS. 1A, 1B. 1C, and 1D each show a solenoid valve 100 consistent with at least one embodiment of this disclosure. Solenoid valve 100 may include a plunger 102, a coil 104, a spring 106, and a seal 108. As shown in FIG. 1A, in an initial state, coil 104 may not be energized and spring 108 may apply a force to plunger 102 thereby causing seal 108 to contact an opening 110 defined by a body 112 of solenoid valve. As shown in FIG. 1B, with plunger 102 in the first position (i.e., a closed position) a fluid 114 may pass into body 112. Because plunger 102 is in the first position, fluid 110 is not able to flow through solenoid valve 100.

Figure 1C:
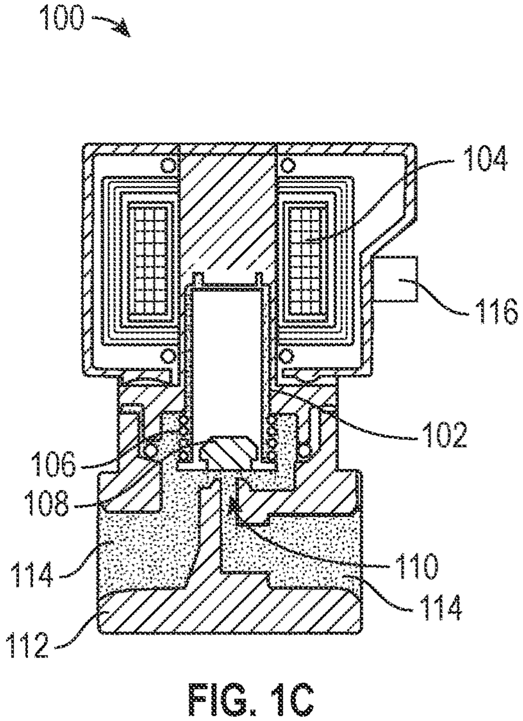
Figure 1D:
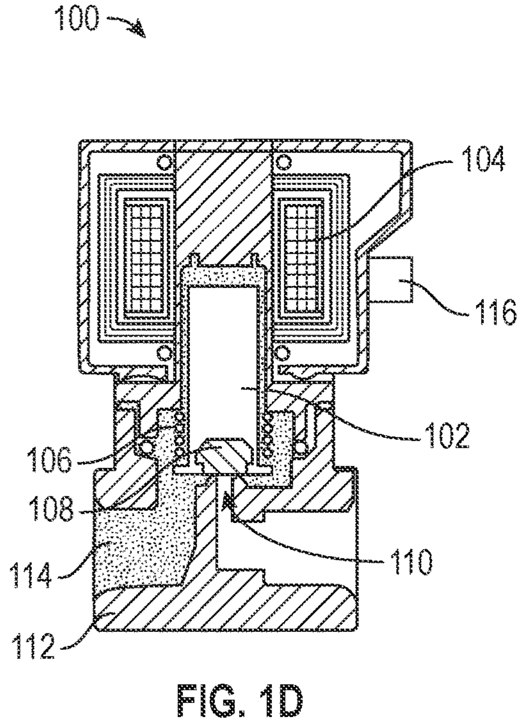

To allow fluid 114 to flow through solenoid valve 100, solenoid valve 100 may be actuated. To actuate solenoid valve 100, coil 104 may be energized by passing a current, such as an alternating current or direct current, through coil 104. Upon energizing coil 104, plunger 102 may travel to a second position (i.e., an open position). With plunger 102 in the second position, fluid 114 may pass through solenoid valve 100 as shown in FIG. 1C. To halt the flow of fluid 114, coil 104 may be deenergized. Upon deenergizing coil 104, spring 106 may cause plunger 102 to travel to the first position. Upon reaching the first position, seal 108 may contact opening 110 thereby stopping the flow of fluid 114.

As disclosed herein, at times solenoid valve 100 may malfunction and plunger 102 may get stuck or otherwise fail to fully travel from the first position to the second position or from the second position to the first position. When this happen, the flow of fluid 114 may deviate from a desired level. For example, when plunger does not fully travel to the second position (i.e., the open position), the flow rate of fluid 114 through solenoid valve 100 may be less than a desired flow rate because plunger 102 may partially block the path of the fluid flow.

When coil 104 is energized and plunger 102 enters coil 104, a magnet flux may be generated or a change in magnet flux may be detectable. The magnet flux, or change in magnet flux may be measured with a sensor 116. For example, sensor 116 may be a Hall effect sensor, a linear Hall effect sensor, etc. that may measure magnet flux and/or changes in magnet flux and output a signal. The output signal may be a voltage that is received by a computing device and correlated to the magnetic flux and/or change in magnetic flux as disclosed herein.

Figure 2:
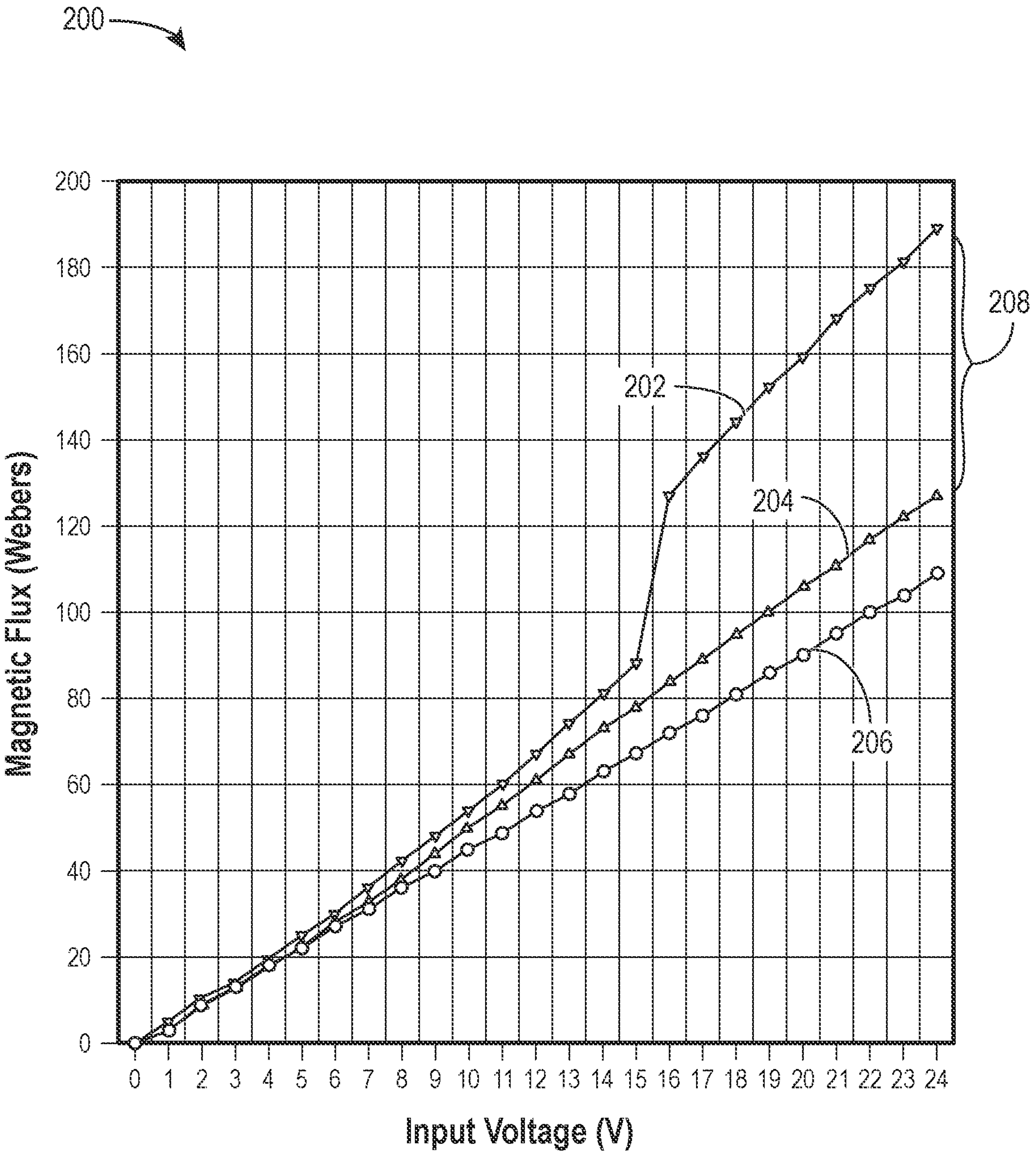
FIG. 2 shows a plot of magnetic flux vs. input voltage for a solenoid valve consistent with at least one embodiment of this disclosure.

FIG. 2 shows a plot 200 of magnetic flux vs. input voltage for a solenoid valve, such as solenoid valve 100, consistent with at least one embodiment of this disclose. When a plunger, such as plunger 102, enters an energized coil, such as coil 104, a sensor, such as sensor 116 may output a voltage that is correlated to the magnetic flux shown in FIG. 2. FIG. 2 shows that the magnetic flux may be different for different positions of the plunger.

As shown in FIG. 2, when a voltage, such as 24 volts is applied to a coil, the magnetic flux changes. During normal operations, as represented by line 202, when the applied voltage reaches a threshold voltage, such as 16V, the magnetic flux may deviate from the linear trajectory. Stated another way, when the plunger is pulled into the energized coil, the plunger may cause a jump in the magnetic flux. The threshold voltage may be a rated voltage for the solenoid valve. For example, the solenoid valve may be designed to actuate at 16V and thus, 16V is required to cause the solenoid valve's plunger to, under normal operating conditions, fully transition from the closed position to the open position.

Stated another way, for a normal solenoid valve mechanism, a movable core plunger, such as an iron core plunger, is held in a closed position by the force of a spring. When a voltage is applied to the solenoid valve, a current flows through the coil to generate a magnetic field, and the coil becomes an electromagnet to generate an electromagnetic force. As the applied voltage increases, the current flowing through the coil also increases, and the magnetic field and electromagnetic force of the coil also increase. The plunger held in the closed position by the force of the spring, and the flow path of the solenoid valve remains closed.

However, when the voltage reaches a threshold voltage, e.g., 16V, the electromagnetic force acting to pull the plunger into the coil overcomes the spring force and pulls up the plunger into the coil. When the plunger enters the coil, the plunger, which may have a metallic (e.g., iron, nickel, cobalt, aluminum, etc. or any metallic alloy) core, is magnetized and adds to the magnetic field created by the energized coil. Therefore, when the plunger is pulled into the coil rapidly (e.g., a small fraction of a second, such as 0.1 seconds or less) by energizing the coil, the magnetic field rapidly increases and produces the jump shown in line 202.

The larger the area of plunger, the larger the amount of magnetic field jump shown in line 202. For example, a first plunger with a first surface area of X, which is greater than a second surface area Y of a second plunger, with have a larger jump in magnetic flux than the second plunger.

Line 204 shows an example when the plunger is stuck in an open position. In the open position, the magnetic flux measured by the sensor may include of the magnetic flux of the coil as the plunger, which is stuck in the coil. Since the plunger is magnetize as the coil is magnetized, the change in magnetic flux remains linear as shown in FIG. 2.

Line 206 shows an example when the plunger is stuck in a closed position. In the closed position, the plunger is not located in the coil. Thus, the magnetic flux measured by the sensor may consists essentially of the magnetic flux of the coil alone. Since the magnetic flux measured consists of essentially the magnetic flux of the coil alone, the measure magnetic flux may be lower than the measured magnet flux of the coil and plunger shown in line 204.

The voltages and point at which the magnetic flux may jump shown in FIG. 2 are for illustrative purposes only. The applied voltage and the voltage at which the jump in magnetic flux happens may depend on many factors. For example, for a spring that exerts a larger force to keep the plunger in the closed position, a greater voltage may need to be applied to move the plunger to the open position. For instance, a first spring may create a first force X and a second spring may generate a second force Y to keep the plunger is the closed position. Therefore, a greater voltage may be required to move a plunger from the closed position using the first spring than the second spring.

As shown by reference numeral 208, magnetic flux readings in between line 204 and line 202, may represent a situation where the plunger is stuck in between the open and closed positions. Stated another way, if the plunger should move from the closed position and become stuck during the transition to the open position, there may be a jump in the magnetic flux, but the jump will not exceed a threshold that indicates the plunger has moved to the open position. For example, line 202 shows an increase of approximately 40 webers. Thus, 40 webers may be the threshold. During a transition from the closed state to the opened state, if the plunger gets stuck, the magnetic flux may only jump 10, 20, or 30 webers. Therefore, the magnetic flux may be less than the 40 webers expected and thus, may indicate an error.

Figure 3:
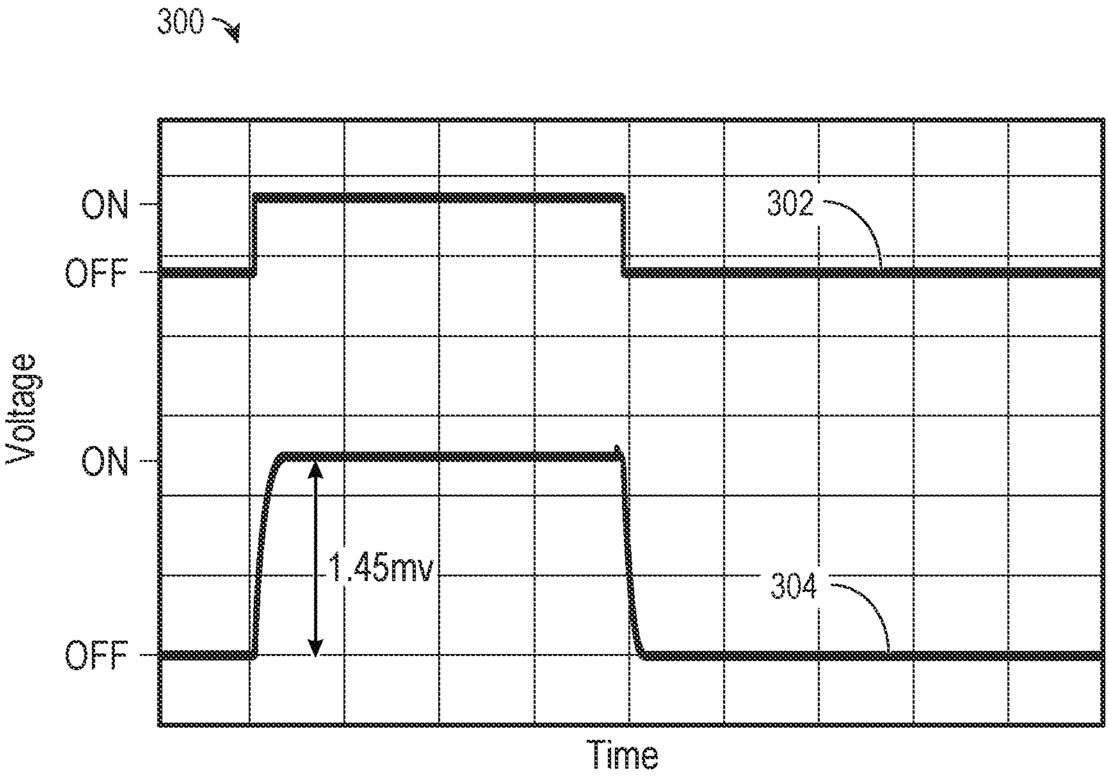
FIG. 3 shows a plot of a command signal and a monitored signal consistent with at least one embodiment of this disclosure.

FIG. 3 shows a plot 300 of a command signal 302 and a monitored signal 304 consistent with at least one embodiment of this disclosure. Specifically, FIG. 3 shows command signal 302 and monitored signal 304 when a solenoid valve, such as solenoid valve 100 functions properly. When the valve is functioning correctly, command signal 302 and monitored signal 304 may be synchronous. For example, when command signal 302 is transmitted from to the solenoid valve to open the valve, the current of voltage may transition from a first or reference state (e.g., a 0V or 0 amps) state to second or operational state (e.g., X volts or Y amps). The signal may energize a coil, such as coil 104. Upon energizing the coil, the plunger, such as plunger 102 may be drawn into the coil thereby resulting in a change in magnetic flux as disclosed herein. Upon the change in magnetic flux, a sensor, such as sensor 116, may transmit a signal, (i.e., monitored signal 304).

As disclosed herein, monitored signal may be synchronous with command signal 302 since upon energizing the coil, the plunger may be drawn into the coil immediately resulting in the magnetic flux changing instantaneously or nearly instantaneously with the energizing of the coil as shown in FIG. 3. The value in which monitored signal 304 jumps may be a known valve for a solenoid valve. For example, for a given solenoid valve, the value of monitored signal may increase from 0V to 1.45 mV upon the plunger being drawn into the coil. Thus, any deviation from monitored signal 304 may indicate an error in the operation of the solenoid valve as disclosed herein.

Figure 4A:
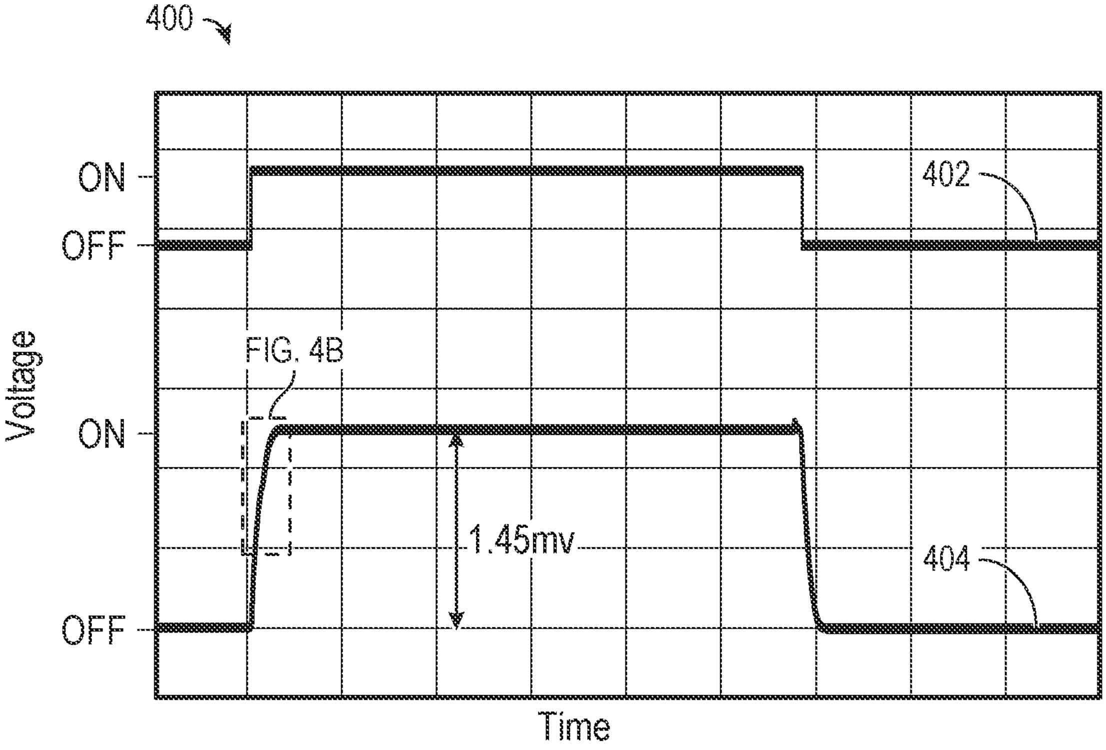
FIGS. 4A and 4B show a plot of a command signal and a monitored signal consistent with at least one embodiment of this disclosure.
Figure 4B:
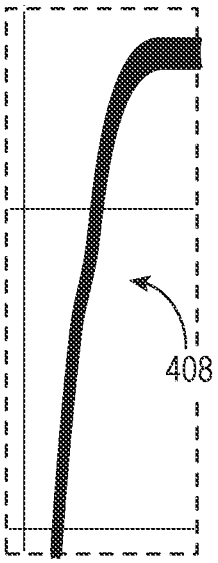

FIG. 4 shows a plot 400 of a command signal 402 and a monitored signal 404 consistent with at least one embodiment of this disclosure. More specifically, plot 400 shows an example of when there is an abnormality with a valve. For example, and as shown in detail in FIG. 4B, during a ramp up period associate with energizing the coil and the transitioning of the plunger from a closed state to an open state, monitored signal 404 may have an irregularity 408. Irregularity 408 may indicate a non-smooth and/or continuous movement of the plunger as represented by a bump or other discontinuity in monitored signal 404. For example, if the plunger momentarily gets stuck, irregularity 408 may indicate an increased in the operational load due to the plunger getting stuck.

Figure 5:
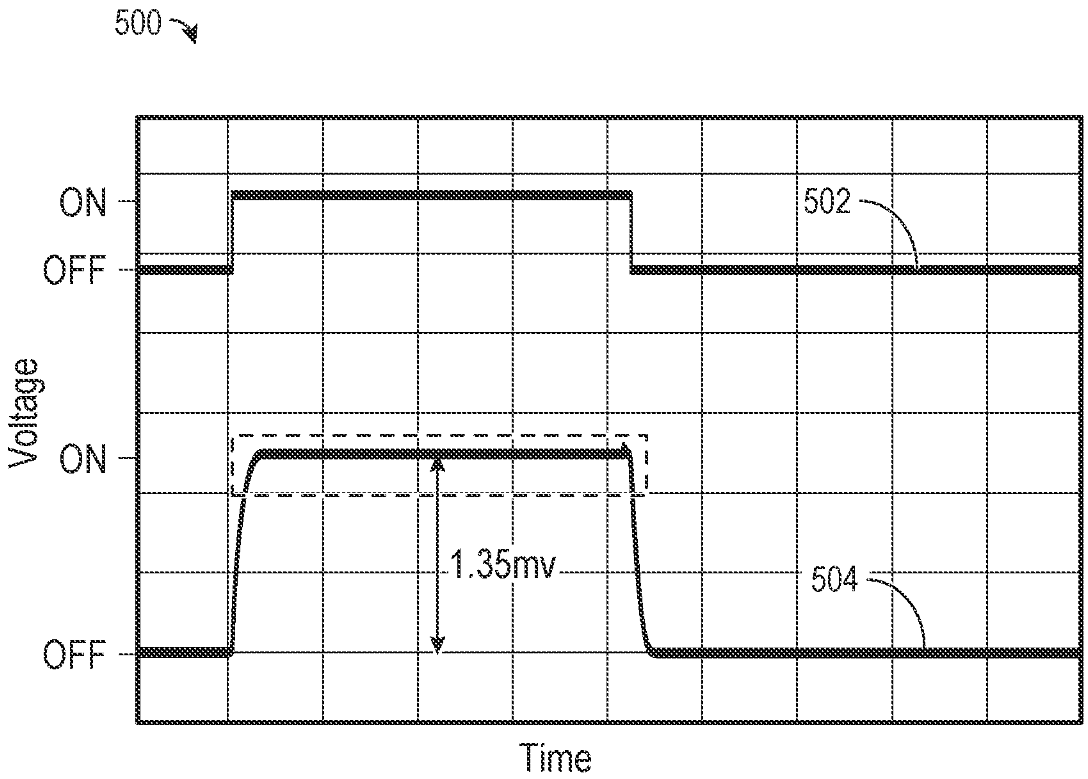
FIG. 5 shows a plot of a command signal and a monitored signal consistent with at least one embodiment of this disclosure.

FIG. 5 shows a plot 500 of a command signal 502 and a monitored signal 504 consistent with at least one embodiment of this disclosure. FIG. 5 shows an example of when debris may find its way in between moving portions of a solenoid valve. For example, when debris may find its way in between the plunger and a surface against which the plunger slides or otherwise moves. The debris may cause a stroke or distance that the plunger travels to be shorter than a normal distance the plunger may travel when debris is not present. Thus, as shown in FIG. 5, the sensor may output a monitored signal, i.e., monitored signal 504, that that does not have the same voltage step as during normal operations. For example, instead of monitored signal 504 having a voltage step of 1.45 mV expected during normal operations, monitored signal 504 may have a voltage step of 1.35 mV that indicates a shorter plunger travel stroke. The decrease in monitored signal 504 may be due to the reduced stroke causing an area of a core contained in the coil being smaller than during normal operations. Therefore, the reduced core area may lead to a decrease of the magnetic flux measured by a Hall effect sensor.

As disclosed herein, using a Hall effect sensor may allow for the detection of the opening and closing reaction times of a solenoid valve. By monitoring the reaction times, it is also possible to detect an abnormal operation of the solenoid valve. Using a sensor as described herein, both the conditions at which solenoid valves normally function and conditions at which are malfunctioning can be detected. Signals outputted from magnetic sensors may differ according to types of valves. Therefore, multiple judgment logics may be developed and implement for a variety of sensors. As disclosed herein, sensor may correlate magnetic quantities as linear outputs. Therefore, abnormalities of solenoid valves may be judged by a number of judgment logics as shown in Table 1 (depicted in FIGS. 22A and 22B) to determine accurate operating conditions of solenoid valves.

The waveforms of magnetic quantities received from sensors may be judged using the logics in Table 1. Upon detecting an abnormality, a pre-failure status may be determined. Upon determined a pre-failure status exists, an alarm may be activated and/or an automated analyzer's operations may be terminated. In addition, upon detecting the pre-failure status a self-diagnostic testing procedure may be initiated. The self-diagnostic testing may include testing flow rates through the automated analyzer to confirm the valve is stuck. Table 1 presents nine different logics that may be used to detect abnormalities. While Table 1 shows nine logics, any number of logics may be created to detect abnormalities and more than one logic may be used with a signal valve to detect different types of abnormalities.

Figure 6:
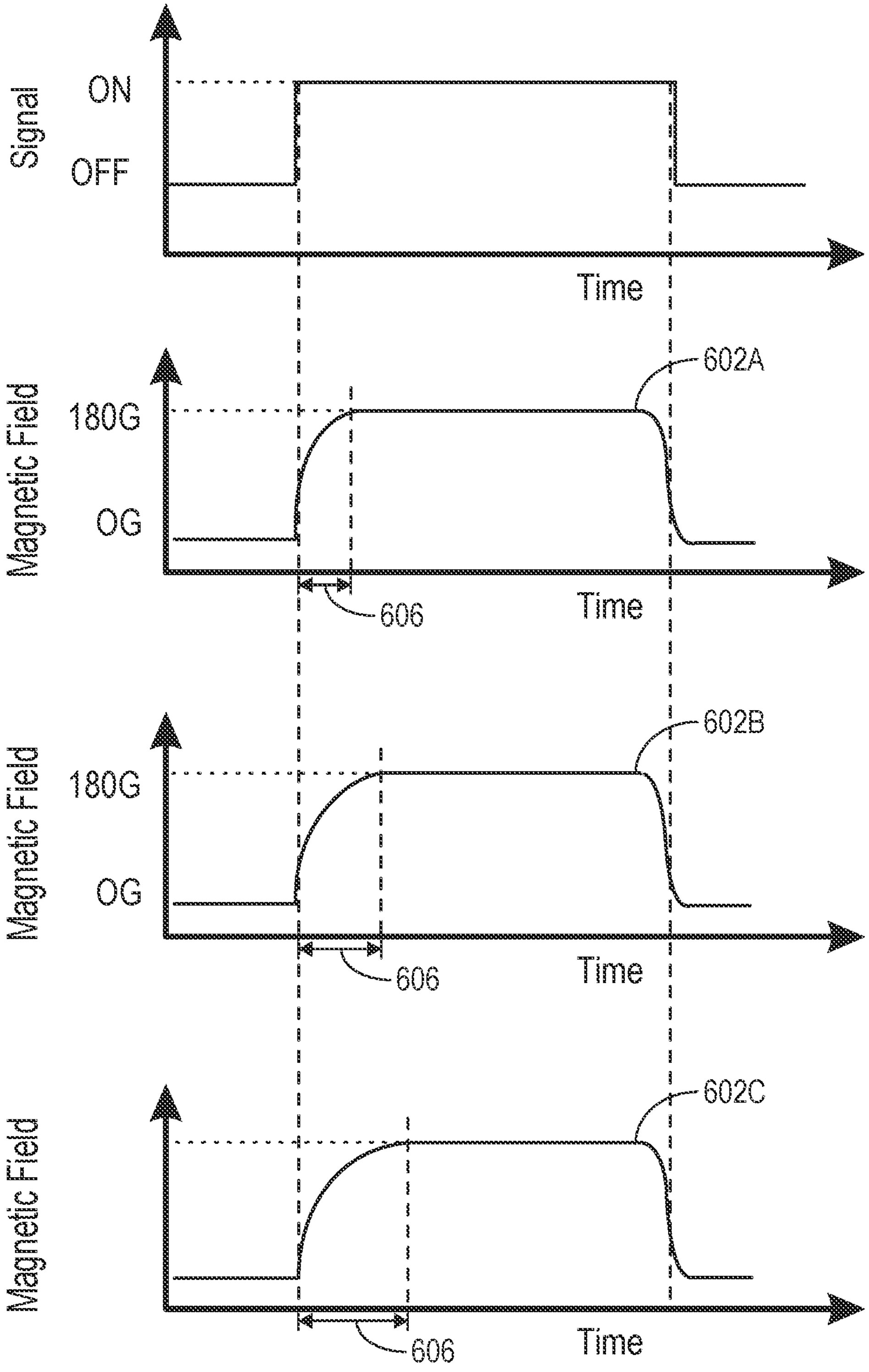
FIGS. 6-16 each shows different signals corresponding to respective logics for detecting abnormalities in accordance with at least one example of this disclosure.

Logic 1 shows a rising delay and may be used to test whether or not a delay between an "on" signal and an "on" signal from the sensor is greater than a threshold. Stated another way, logic 1 may be used to detect an abnormality using a delay from the time an activation (i.e., control) signal is sent to a coil and the time the sensor returns a signal indicated a magnetic flux change due to the plunger being drawn into the coil of the solenoid valve. For example, FIG. 6 shows magnetic field responses 602 (labeled individually as responses 602A, 602B, and 602C) in relation to an activation signal 604 being transmitted to a valve. The individual responses 602 may correspond to different threshold values of the time delay 606 between open and closing signals. For example, response 602A may correspond to a threshold of 10 ms, response 602B may correspond to a threshold of 50 ms, and response 602C may correspond to a threshold of 100 ms. An example valve where logic 1 may be used is a sample/reagent dispensing valve of an automated analyzer.

Figure 7:
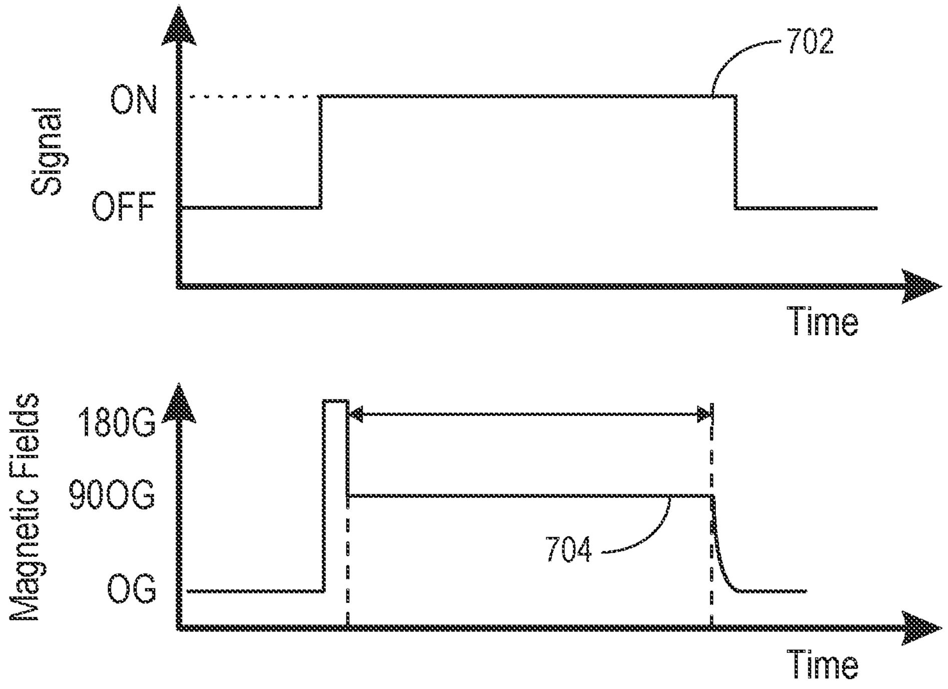

FIG. 7 shows waveforms for 3-way valves in accordance with at least one example of this disclosure. As shown in FIG. 7, a control signal 702 may be supplied to a valve and magnetic field response 704 may be measured. In the case of 3-way valves, the waveforms shown in FIG. 7 will be outputted and magnetic quantities may be overrun due to transient phenomenon. Therefore, it may be necessary to judge within a time frame of stable magnetic quantities such as those shown in FIGS. 8 and 9.

Figure 8:
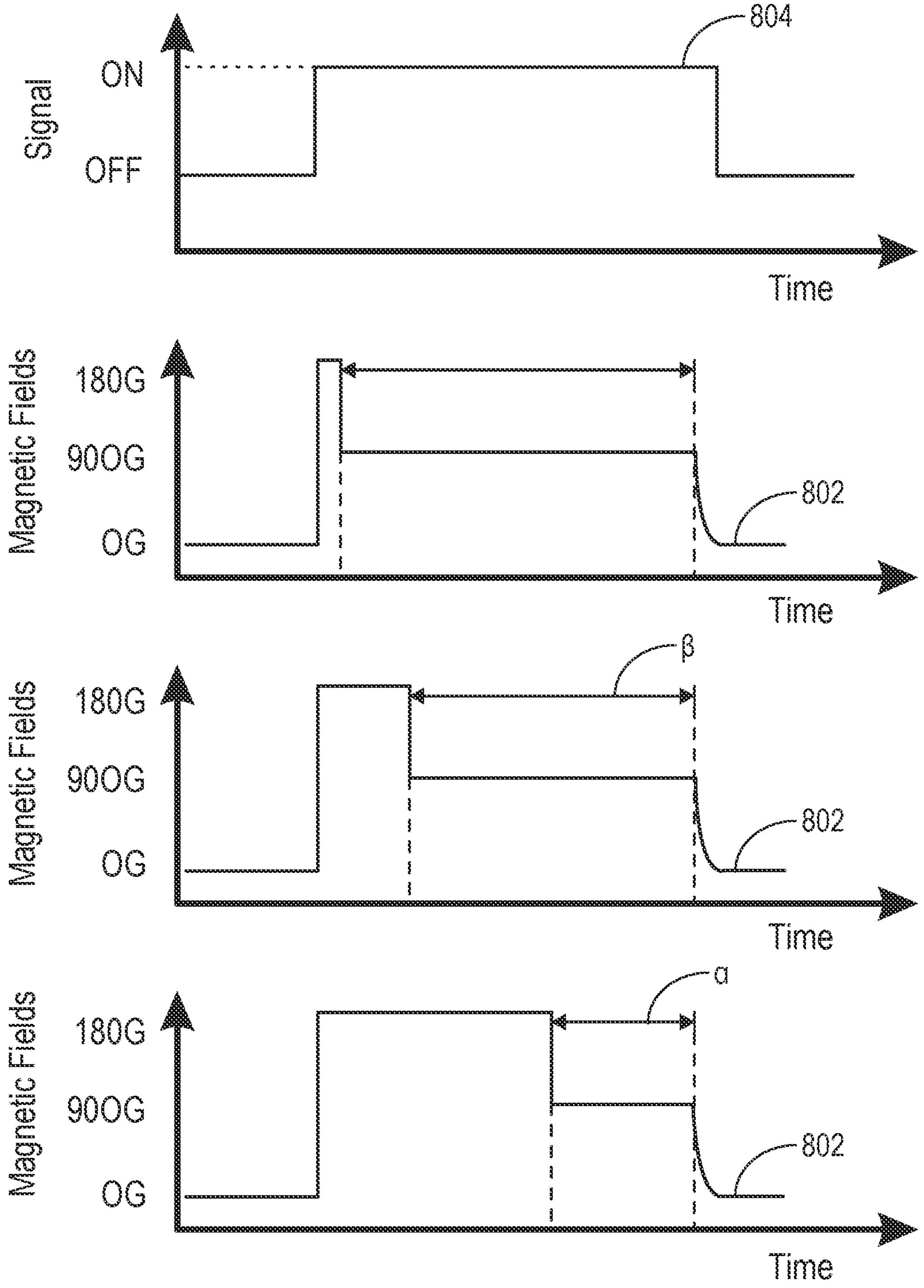

Logic 2 shows an "on" period check and may be used to test whether or not a delay between an "on" signal and an "on" signal from the sensor exceeds a threshold similar to logic 1, but when greater precision control is required. For example, FIG. 8 shows magnetic field response 802 in relation to an activation signal 804 being transmitted to a valve. Response 602 may correspond to different offsets that allow for oscillation of response 602. As disclosed herein, a normal value, such as a mean value may be offset by values $\alpha$ and $\beta$. $\alpha$ and $\beta$ may be time values. $\alpha$ may be a value less than $\beta$. $\beta$ may be larger than $\alpha$ and may correspond to a time immediately before control signal 804 is turned off. Non-limiting example valves where logic 2 may be used is a detergent creation valve, waste valve, atmospheric release valve, etc.

Figure 9:
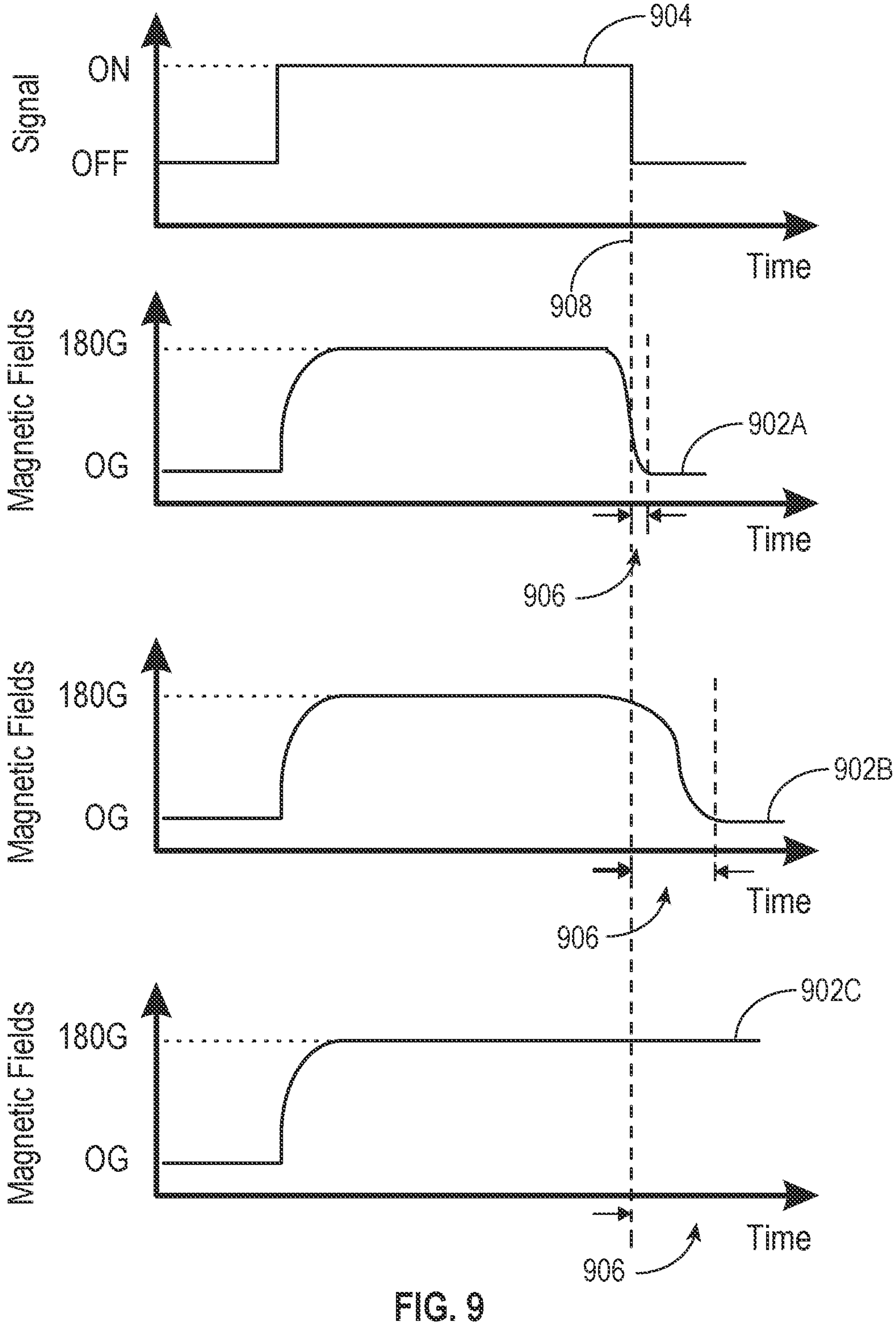
Figure 11:
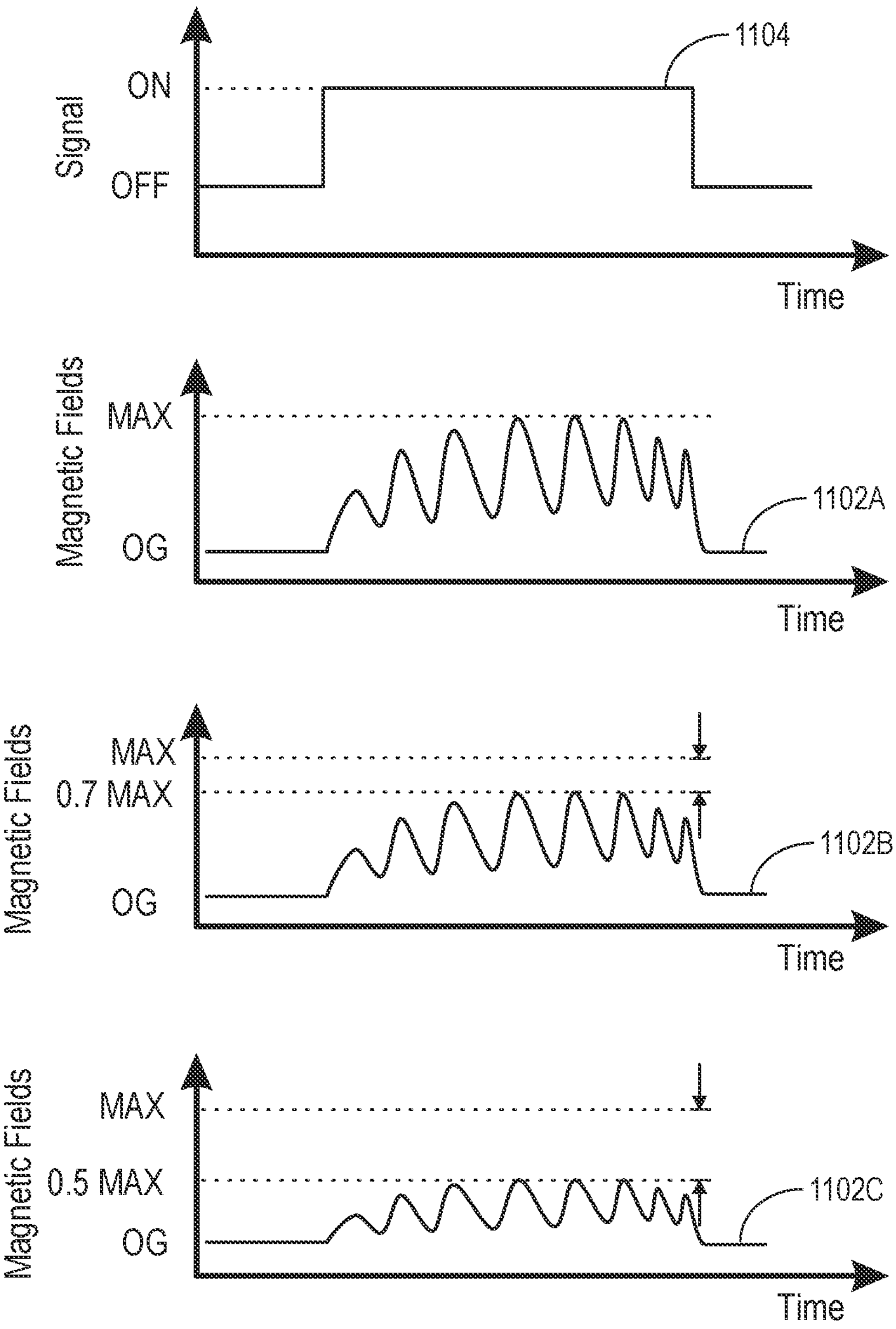

Logic 3 shows a declining delay and may be used to test whether or not a delay between an "off" signal and an "off" signal from the sensor is greater than a threshold. Stated another way, logic 3 may be used to detect an abnormality using a delay from the time an activation (i.e., control) signal is turned off to deenergize the coil and the time the sensor returns a signal indicated a magnetic flux change due to the plunger being forced out of the coil by a spring. Logic 3 may also be used to detect whether or not a diaphragm of the valve is stuck and causing plunger movement blockages. For example, FIG. 9 shows magnetic field responses 902 (labeled individually as responses 902A, 902B, and 902C) in relation to an activation signal 904 transmitted to a valve being turned off. The individual responses 902 may correspond to different threshold values of the time delay 906 from a cutoff time 908. For example, response 902A may correspond to a threshold of less than 10 ms for normal operations, response 902B may correspond to a threshold of 50 ms for a plunger that may temporality get stuck during a closing transition, and response 902C may correspond to a threshold greater than 100 ms, which may indicate a valve stuck in a given position. An example valve where logic 3 may be used is a sample inner wash valve of an automated analyzer.

Figure 10:
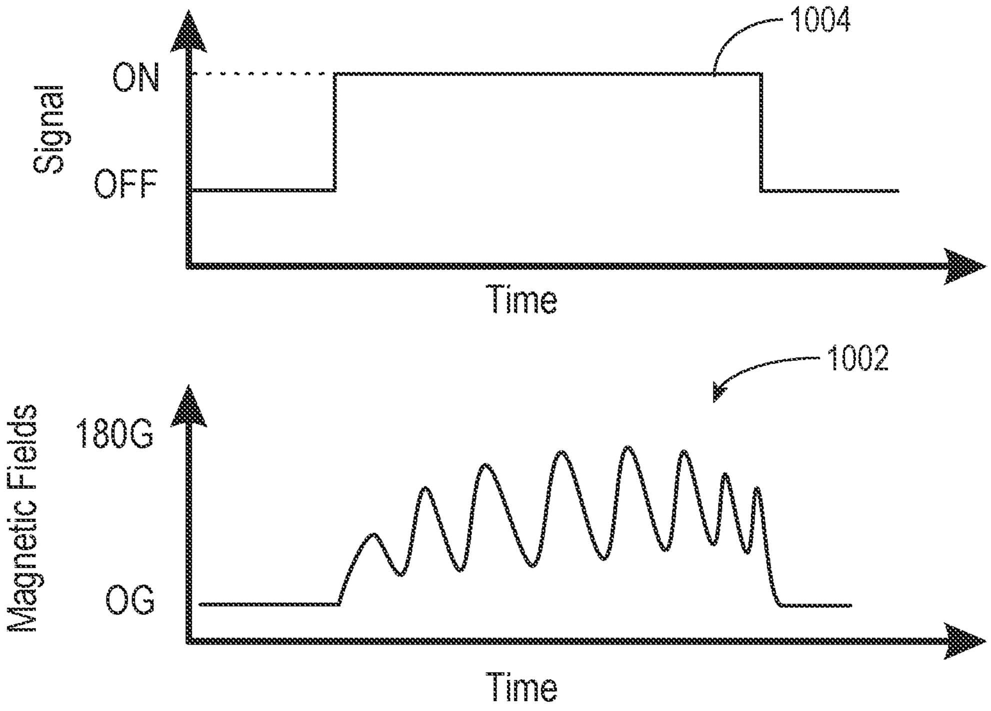

FIGS. 6-9 may correspond to direct current being applied to the coil of a solenoid valve. However, alternating current may be applied. FIG. 10 shows a magnetic field response 102 in relation to an activation signal 1004 being transmitted to a valve. As shown in FIG. 10, because the currently applied to coil is alternating, the waveform of response 602 may be period or otherwise non-constant. Stated another way, judgment for possible defects may not be made by mean values when alternating current is applied to the coil. Therefore, alternative methods may be needed.

Logic 4 may be used to test whether or not the wave form corresponding an "on" state is stable due to deteriorations caused by changes of magnetic quantities at the time of normal solenoid valve operations. For example, FIG. 10 shows magnetic field responses 1002 (labeled individually as responses 1002A, 1002B, and 1002C) in relation to an activation signal 1004 being transmitted to a valve. The individual responses 1002 may correspond to different threshold values of deterioration. For example, response 1002A may correspond to normal valve operations in which a maximum value is reach, response 1002B may correspond to a threshold of 0.7 of the maximum value, and response 1002C may correspond to a threshold of 0.5 of the maximum value. The different response valves shown for responses 1002B and 1002C may correspond to different levels of deteriorations (i.e., wear) in the valve. An example valve where logic 4 may be used is an alternative current solenoid valve.

Figure 12:
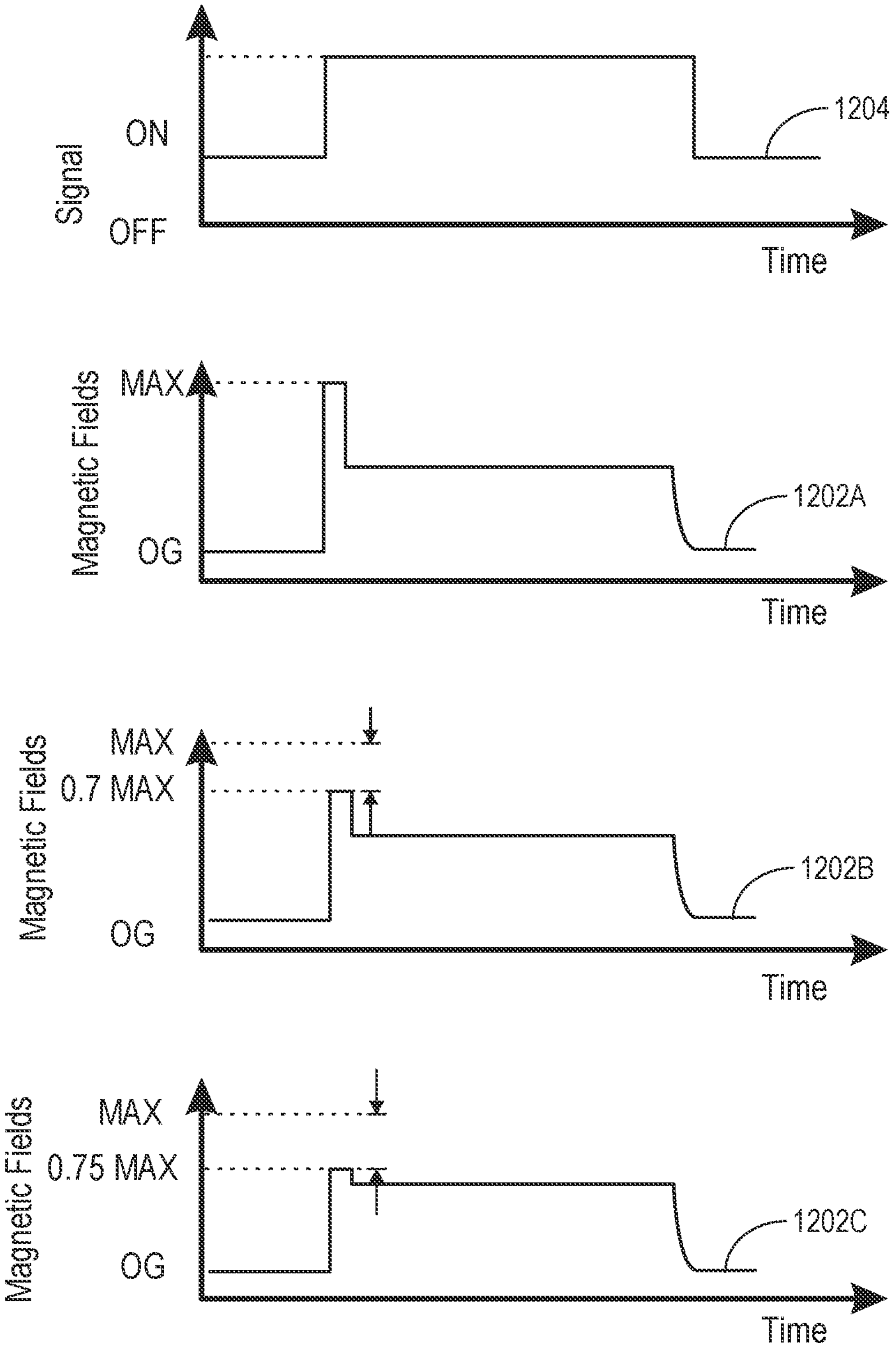

Logic 5 may be used for the same cases of logic 1 and logic 3 but used for a valve where the "on" time is not stable. For example, FIG. 12 shows magnetic field responses 1202 (labeled individually as responses 1202A, 1202B, and 1202C) in relation to an activation signal 1204 being transmitted to a valve. For example, response 1202A may correspond to normal valve operations in which a maximum value is reach, response 1202B may correspond to a threshold of a deviation from the maximum value by 0.7, and response 1202C may correspond to a threshold of a deviation from the maximum value of 0.75. An example valve where logic 5 may be used is a sample inner wash valve of an automated analyzer.

Figure 13:
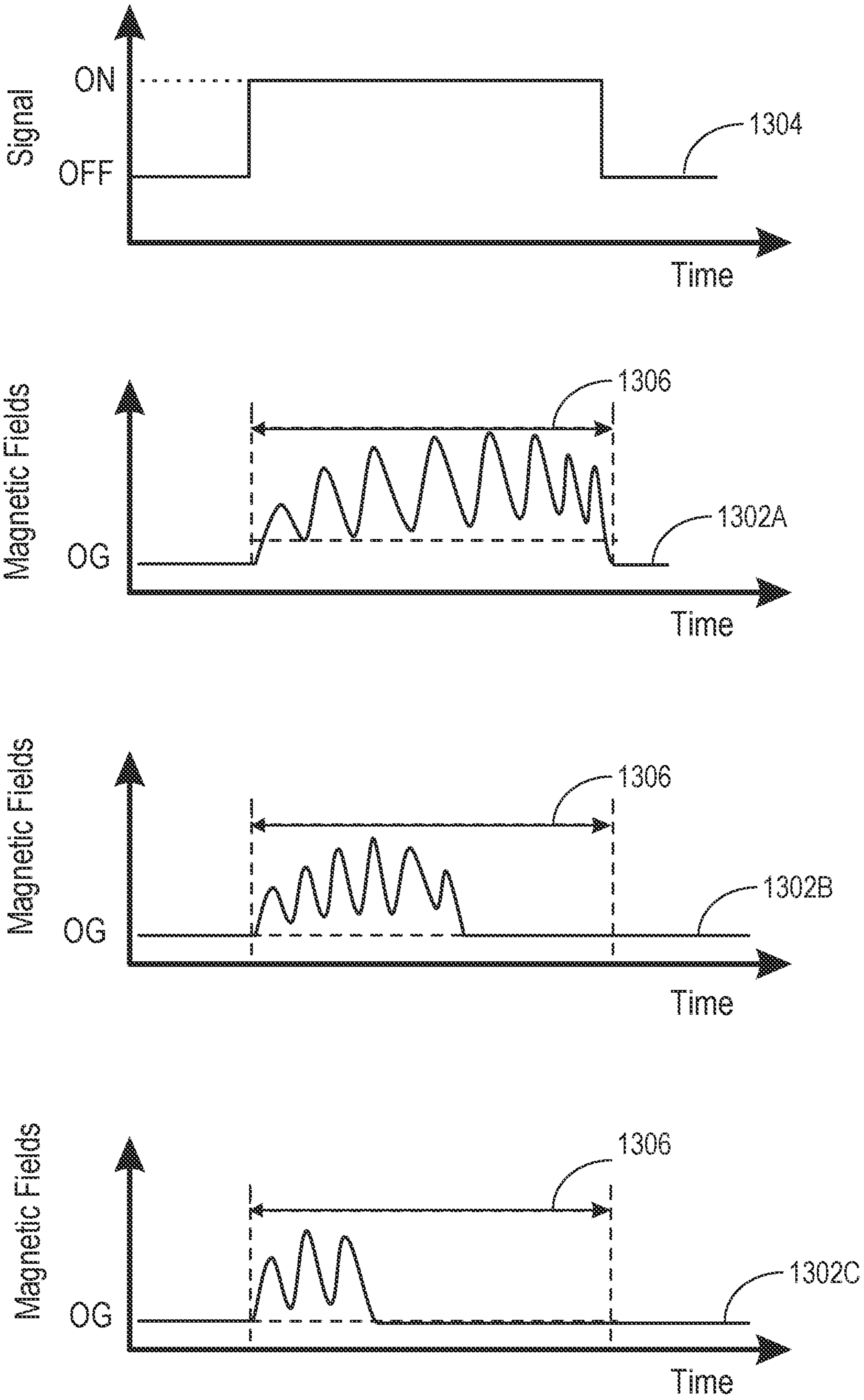

Logic 6 may be used to detect whether or not the wave form for the "on" state is stable or unstable over time due to deterioration. For example, FIG. 13 shows magnetic field responses 1302 (labeled individually as responses 1302A, 1302B, and 1302C) in relation to an activation signal 1304 being transmitted to a valve. The individual responses 1302 may correspond to different threshold values of the mean value 1306 between open and closing signals. For example, response 1302A may correspond to normal valve operations in which the magnetic field is detected for mean vale 1306, response 1302B may correspond to a threshold where the magnetic field is detected for mean value 1306 +/−10%, and response 1302C may correspond to a threshold where the magnetic field is detected for mean value 1306 +/−15%. An example valve where logic 6 may be used is an alternative current solenoid valve.

Figure 14:
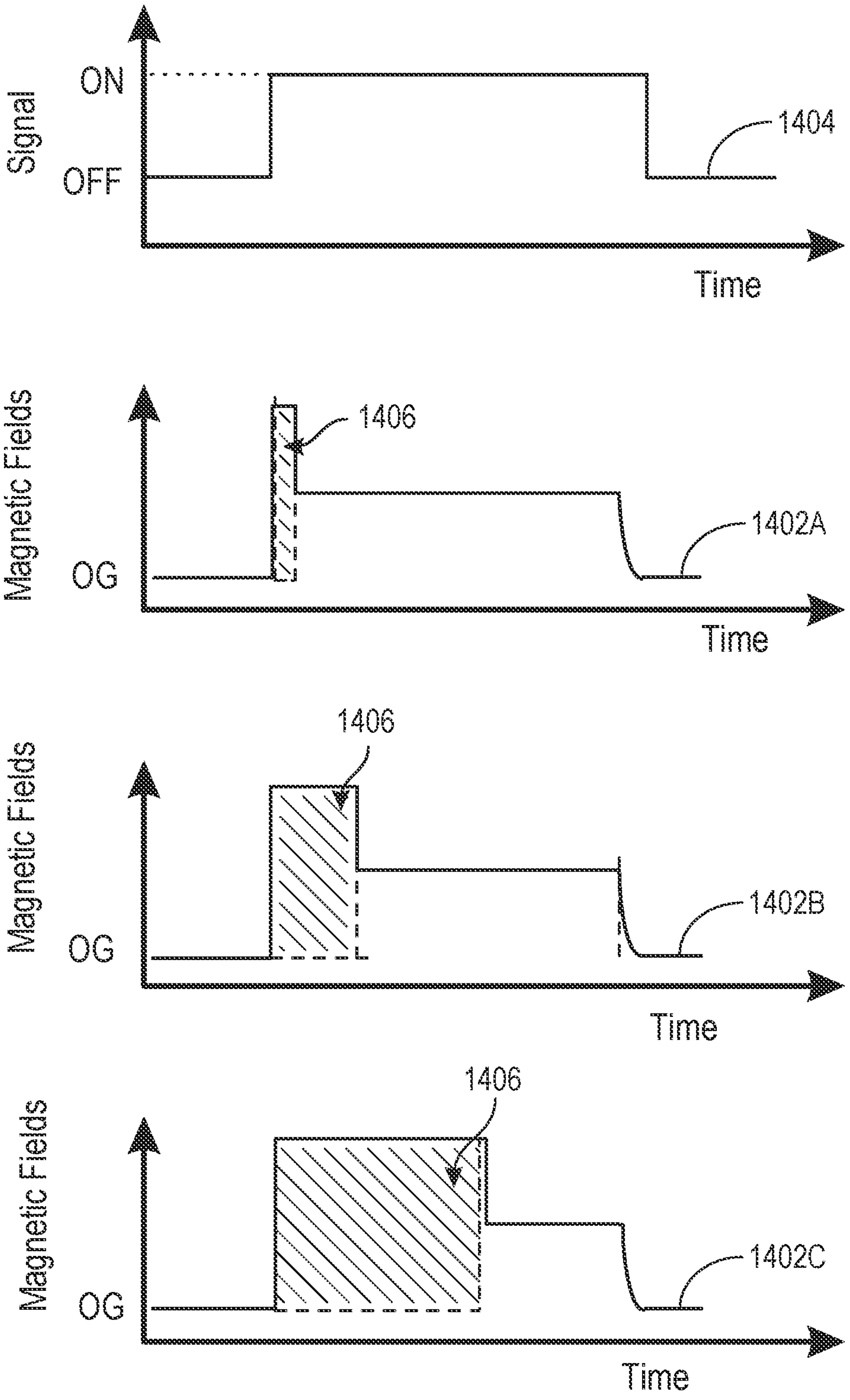

Logic 7 may be used for the same cases of logic 1 and logic 3 but used for a valve where the "on" time is not stable. For example, FIG. 14 shows magnetic field responses 1402 (labeled individually as responses 1402A, 1402B, and 1402C) in relation to an activation signal 1404 being transmitted to a valve. For instance, response 1402A may correspond to normal valve operations in which the magnetic field is detected for mean vale 1406 for the initial energization of the coil, response 1402B may correspond to a threshold where the magnetic field is detected for mean value 1406 +/−10%, and response 1402C may correspond to a threshold where the magnetic field is detected for mean value 1406 +/−15%. Responses 1402B and 1402C may corresponding to longer times for the plunger to reach the open position indicated a potential malfunction. An example valve where logic 7 may be used is a solenoid valve with a power saving circuit. In an example embodiment that utilizes logic 7 the solenoid valve may require the most power at the moment of energization (i.e., when the coil is activated or switch from "off" to "on") and does not require as much power to maintain the energized coil. Therefore, in the case of a solenoid valve may have a built-in power saving circuit to prevent heat generation and the like.

Figure 15:
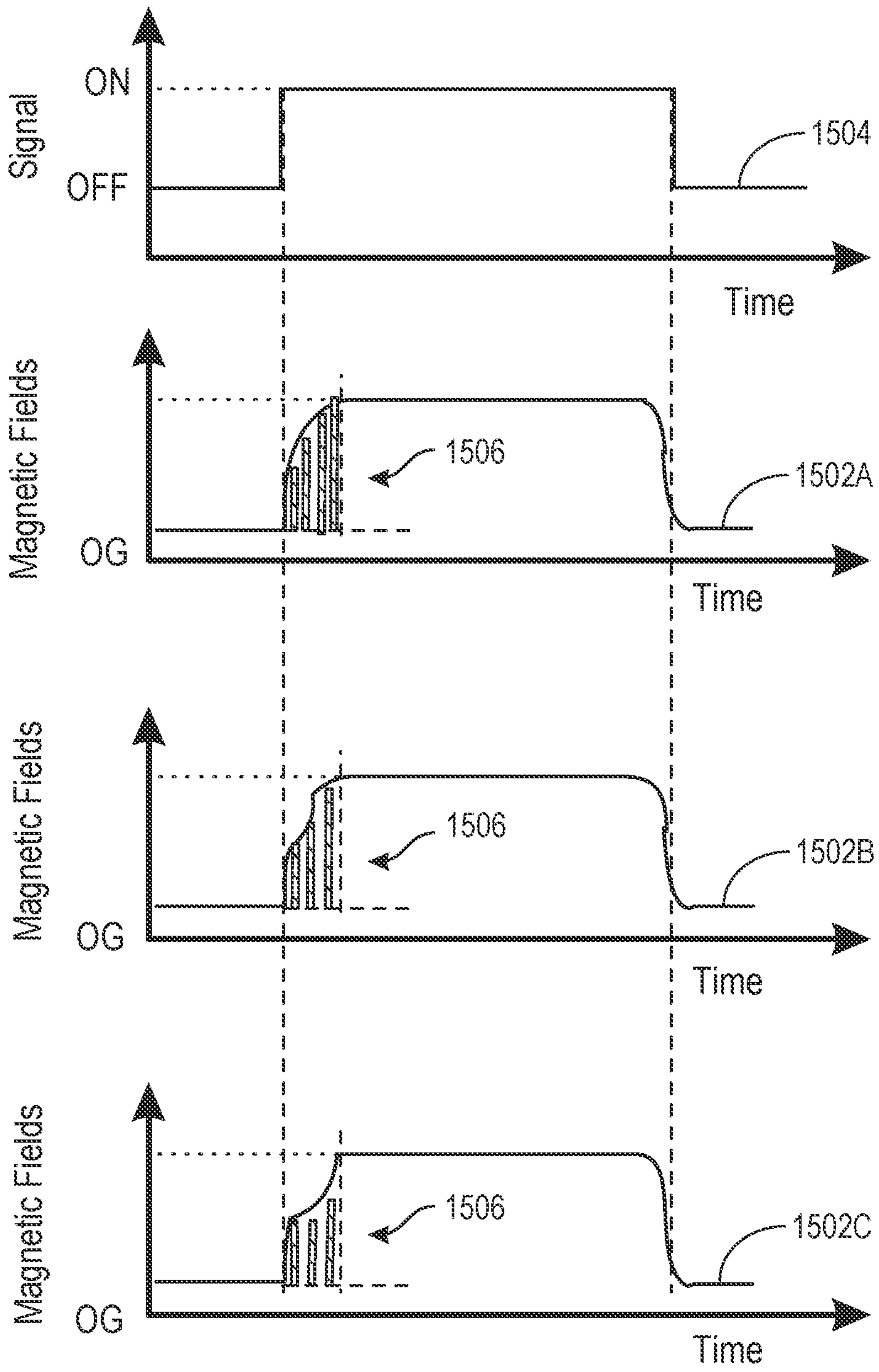

Logic 8 may be used to detect smaller defect within a valve using a rising integral. In other words, logic 8 may be more sensitive way to detect valve failures or gradual degradation of a valve's functionality before a major malfunction occurs. For example, FIG. 15 shows magnetic field responses 1502 (labeled individually as responses 1502A, 1502B, and 1502C) in relation to an activation signal 1504 being transmitted to a valve. The individual responses 1502 may correspond to different threshold values of the mean value 1506 between open and closing signals. For example, response 1502A may correspond to normal valve operations in which the magnetic field is detected for mean vale 1506, response 1502B may correspond to a threshold where the magnetic field is detected for mean value 1506 +/−10%, and response 1502C may correspond to a threshold where the magnetic field is detected for mean value 1506 +/−15%. An example valve where logic 8 may be used is sample inner wash valve of an automated analyzer.

Figure 16:
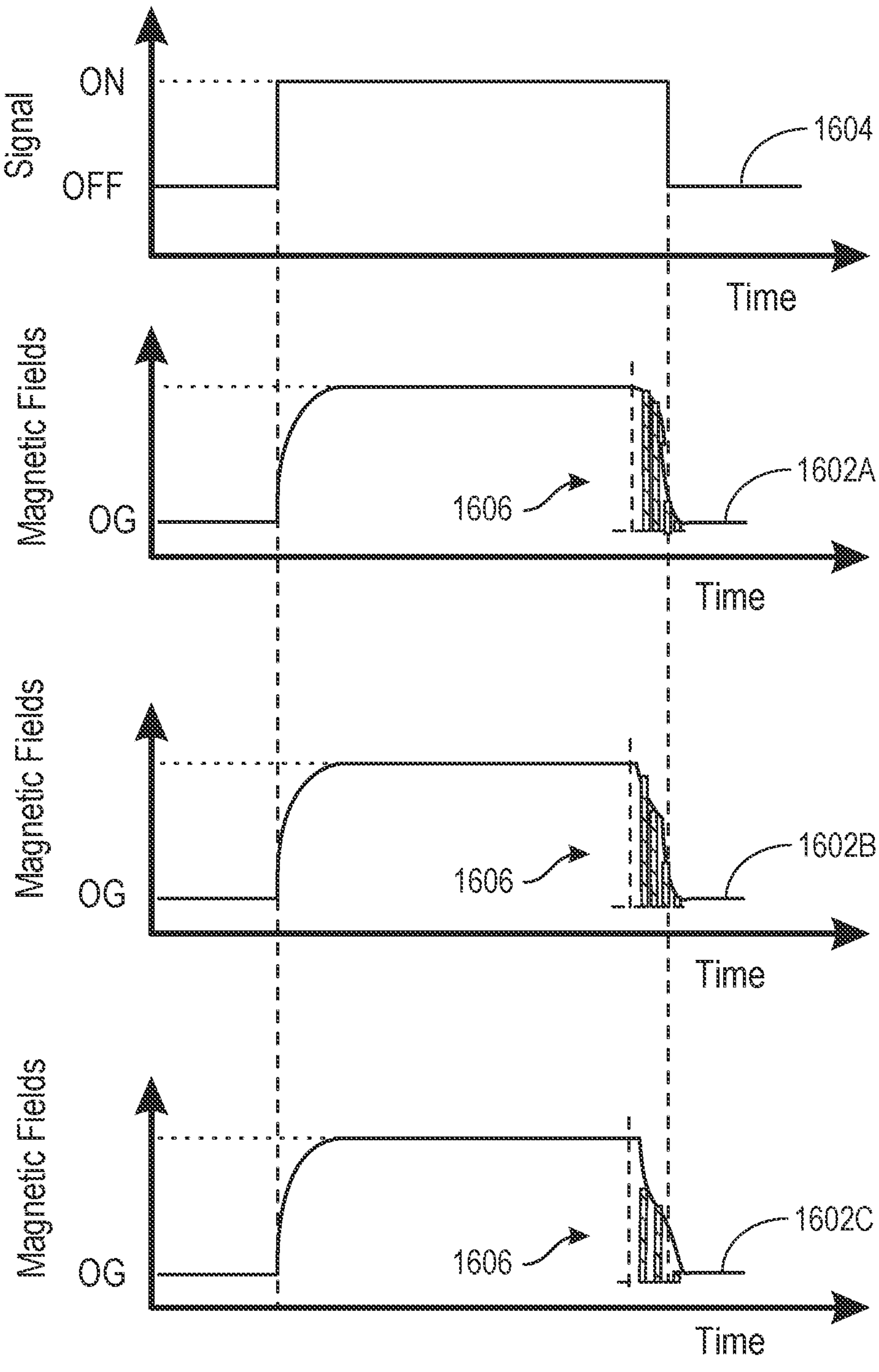

Logic 9 may be used to detect smaller defect within a valve as disclose with respect to logic 8 and FIG. 15, except using a declining integral for transition from an "on" state to an "off" state whereas logic 9 and FIG. 15 are directed to detecting malfunctions while transitioning from an "off" state to an "on" state. For example, FIG. 16 shows magnetic field responses 1602 (labeled individually as responses 1602A, 1602B, and 1602C) in relation to an activation signal 1604 being transmitted to a valve. The individual responses 1602 may correspond to different threshold values of the mean value 1606 between open and closing signals. For example, response 1602A may correspond to normal valve operations in which the magnetic field is detected for mean vale 1606, response 1602B may correspond to a threshold where the magnetic field is detected for mean value 1606 +/−10%, and response 1602C may correspond to a threshold where the magnetic field is detected for mean value 1606 +/−15%. An example valve where logic 8 may be used is sample inner wash valve of an automated analyzer.

In the cases of logic 8 and 9 and corresponding FIGS. 15 and 16, judgments may happen by the maximum value, the mean value or the integral of rising tilts, etc. The magnetic field responses shown in FIG. 6-16 may be correlations to a voltage. For example, a Hall effect sensor may output a voltage and a processor may use formulas or lookup tables to correlate the voltage to the magnetic field readings shown in FIGS. 6-16.

Since there are variations because of individual differences of solenoid valves and sensors, or variations of magnetic quantities because of installation positions, by performing calibrations for threshold setting and corrections and zero-corrections of thresholds, magnetic quantities may be measured with better accuracy. For example, a mean value of results of multiple measurements may be set as the threshold as a normal value. Zero-correction of operation time of solenoid valves may be set. Zero-correction of magnetic quantity plus a value at the time of the solenoid valve being activated (i.e., turned "on") may be used to provide gain correction.

While voltages have and Hall effect sensors have been disclosed herein, electric current sensors may be used. For example, the current change to the valve may be monitored to monitor opening/closing of the solenoid valve. Thus, the output signals disclosed herein may be a current reading.

Figure 17:
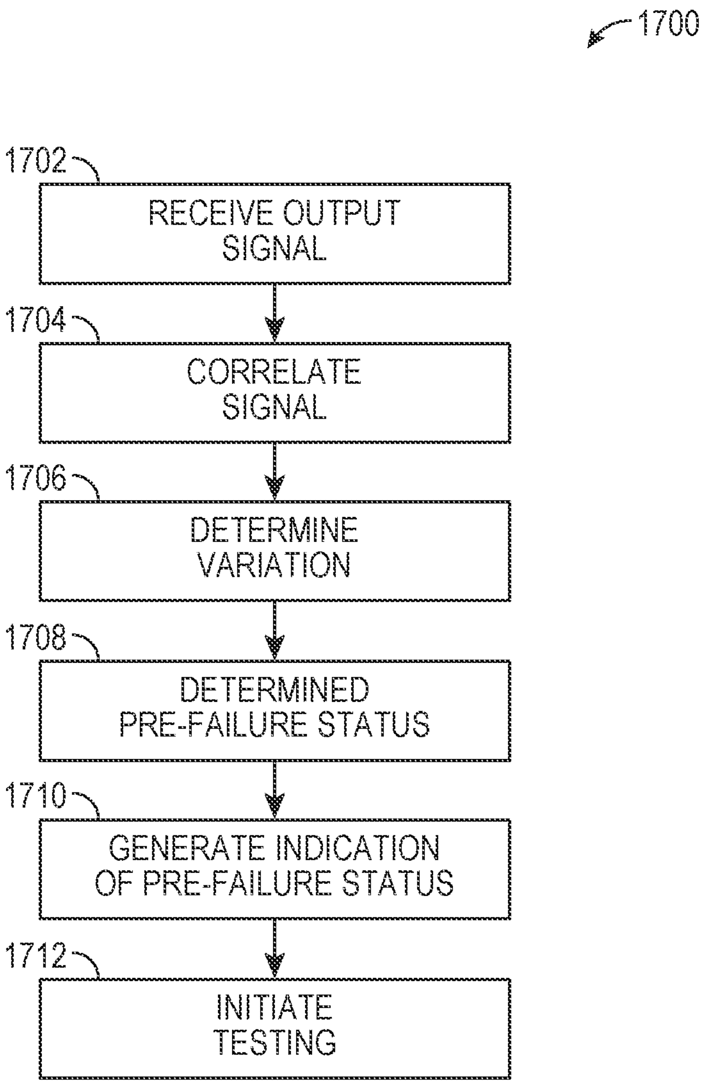
FIG. 17 shows an example method consistent with this disclosure.

FIG. 17 shows an example method 1700 consistent with this disclosure. Method 1700 may begin at stage 1702 where an output signal may be received. The output signal may be from a sensor located proximate a coil of a solenoid valve. For example, the output signal may be a voltage. In another example the output may be a signal correlated to a magnetic flux. For instance, the sensor may include circuitry that may convert a reading into a signal and transmit the signal to a processor as disclosed herein.

In another example, a processor may receive the output signal and correlate the voltage to a magnetic flux reading and/or a change in a magnetic field using a mathematical formula or lookup tables (1704). Correlating the voltage to a magnetic flux reading may include converting the output signal into a waveform and determining when the waveform deviates from a predefine waveform by a predetermined range. For example, the output signal may be converted to a waveform as shown in any one of FIGS. 6-16.

Method 1700 may include determining a variation of a magnetic field proximate the coil of the solenoid valve based on the output signal of the sensor (1706). For example, variation of the magnetic field proximate the coil of the solenoid valve may include a sudden change, such as within less than 10 ms, in the magnetic field as the plunger is drawn into the energized coil or pushed out of the coil by a spring. In another example, The signal may be converted into a waveform as disclosed herein and the waveform may then be compared to a known or expected waveform to determined deviations from the known or expected waveform. For instance, the values that make up the waveform may be subtracted from the known or expected waveform to determined of the waveform deviates from the known or expected waveform by the predetermined range.

Determining when a deviation occurs can include selecting a logic and the logic selected can be dependent on the type of the solenoid valve. For example, as shown in Table 1, each of the various logics may be applicable to a different type of solenoid valve. Thus, the logic selected to determine of a deviation occurs can be selected based on the type of solenoid valve used in the automated analyzer.

Once a deviation that exceeds a threshold is detected, a pre-failure status may be determined (1708). As disclosed herein, the pre-failure status may indicate a failure is likely to occur within a given time period. For example, a pre-failure status may indicate a failure may occur within X hours or Y days. Therefore, maintenance may be needed.

Upon determining the pre-failure status, an indication of the pre-failure status may be generated (1710). The indication may include discontinuing an assay procedure due to the variation of the magnetic field is outside a predetermined range. For example, a processor may transmit a signal to a relay or other component of the automated analyzer to terminal any current assay procedure being implemented. Terminating the assay procedure may also include halting the transmission of a signal that is driving the assay procedure.

An indication of the pre-failure status may also include activating an alarm to indicate to a technician that maintenance may be needed. For example, upon detecting a deviation, an audible and/or visual alarm may be activated to indicate there is a malfunction of at least one solenoid valve of the automated analyzer.

Method 1700 may also include initiating testing (1712). Initiating testing may include initiating self-diagnostic testing by the automated analyzer as disclosed herein. Initiating testing may also include notifying a technician that maintenance is needed and the technician may perform a system integrity evaluation using a sample of know concentration.

Figure 18:
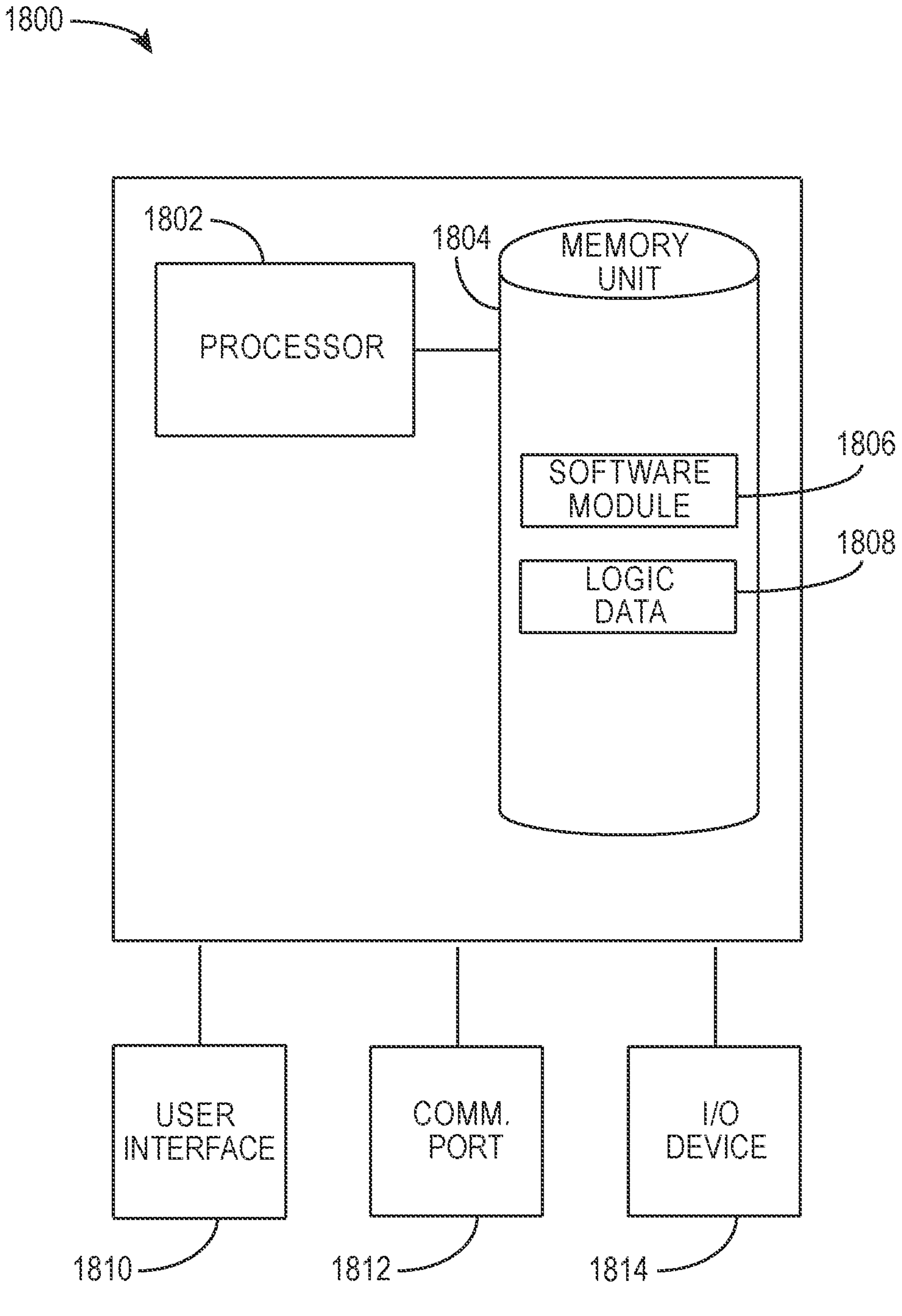
FIG. 18 shows an example schematic of a computing device consistent with this disclosure.

FIG. 18 shows an example schematic of a computing device 1800 consistent with this disclosure. Computing device 1800 may be a component of an automated analyzer or may be a standalone computing device that is electrically coupled to an automated analyzer to send and receive signals as disclosed herein. As shown in FIG. 18, computing device 1800 may include a processor 1802 and a memory 1804. Memory 1804 may include a software module 1806 and logic data 1808. While executing on processor 1802, software module 1804 may perform processes for monitoring a solenoid valve and controlling an automated analyzer, including, for example, one or more stages included in a method 1700 described herein with respect to FIG. 1700. Computing device 1800 also may include a user interface 1810, a communications port 1812, and an input/output (I/O) device 1814.

As disclosed herein, software module 1806 may include instructions that when executed by processor 1802 that cause processor 1802 to receive output signals from sensors, determine when a solenoid valve has a malfunction as disclosed herein, terminate and assay process, and/or activate an alarm. For example, using the output signal processor 1802 may determine a solenoid valve is stuck in the closed position, terminate an assay procedure, and activate an alarm as disclosed herein.

Logic data 1808 may include various logics that may be used to determine when an output signal received by processor 1802 deviates from a predetermined threshold. For example, logic data 1808 may include any of logics 1-9 shown in Table 1. Logic data 1808 may also include formulas and/or lookup tables to correlate the voltage to the magnetic field readings as disclosed herein.

User interface 1810 can include any number of devices that allow a user to interface with computing device 1800. Non-limiting examples of user interface 1810 include a keypad, a microphone, a display (touchscreen or otherwise), etc.

Communications port 1812 may allow computing device 1800 to communicate with various information sources and devices, such as, but not limited to, remote computing devices such as servers or other remote computers maintained by testing facilities, mobile devices, peripheral devices, etc. Non-limiting examples of communications port 1812 include, Ethernet cards (wireless or wired). Bluetooth® transmitters and receivers, near-field communications modules, etc.

I/O device 1814 may allow computing device 1800 to receive and output information. For example, I/O device 1814 may include a sensor connected to a solenoid valve or a port that allows the sensor to be connected to computing device 1800. Non-limiting examples of I/O device 1814 include, a universal serial bus (USB) port, a parallel port, a camera (still or video), fingerprint or other biometric scanners, etc.

EXAMPLES

Figure 19:
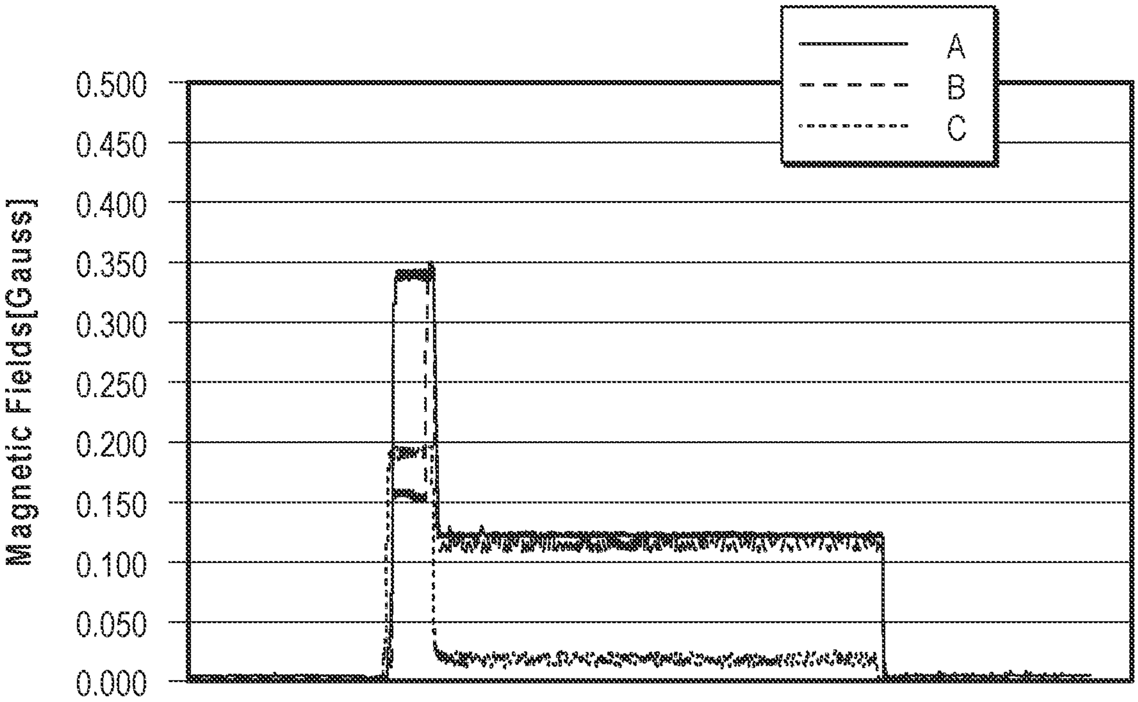
FIG. 19 shows an example consistent with this disclosure.

FIG. 19 shows waveforms for solenoid valve. Line A represents a solenoid valve working properly under normal operating conditions. Line B represents before abnormal operating condition and line C represents Abnormal operating conditions.

The conditions (A) to (C) may be detected as follows using the logic of Table 1.

(A)→(B): Average Period specified (Table 1-Logic No 7)

(A)→(C): Max period specified (Table 1-Logic No 5)

(C)→(B): Average Period specified (Table 1-Logic No 7)

Figure 20:
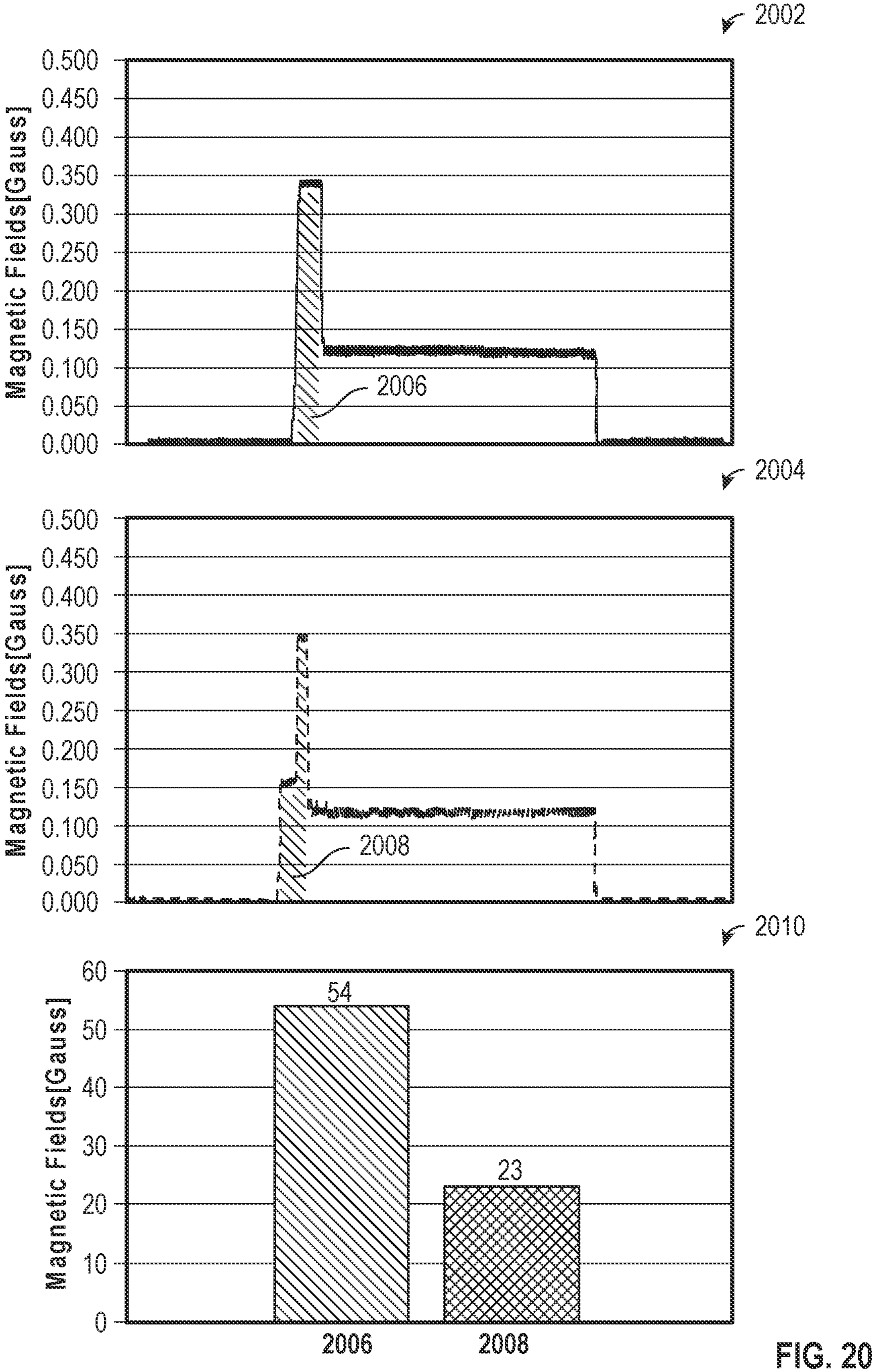
FIG. 20 shows an example consistent with this disclosure.

In FIG. 20, plot 2002 shows the magnetic waveform of the solenoid valve in a normal operating condition, and plot 2004 shows the magnetic waveform of the solenoid valve in a condition that tends to an abnormal condition. Using the systems and methods disclosed herein, it can be detected by comparing the values of the accumulated amounts of shaded areas 2006 and 2008 shown in plot 2010.

Figure 21:
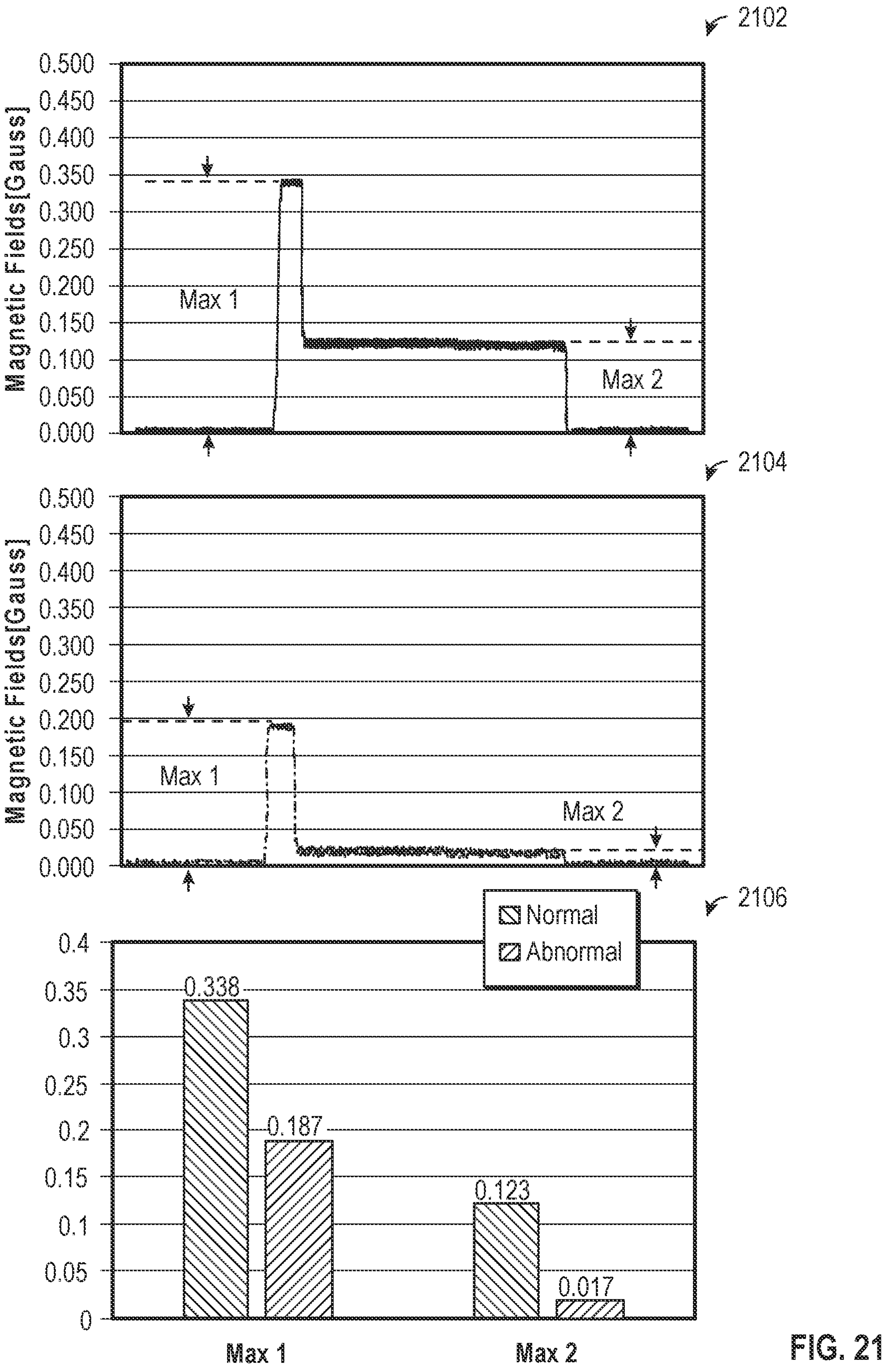
FIG. 21 shows an example consistent with this disclosure.

FIG. 21 shows an example in which a faulty solenoid valve can be detected with the logic of max period specified (Table 1-Logic No. 5) (e.g., condition (A)→(C)). As shown in FIG. 21, there is a difference in the magnetic waveform between normal (plot 2102) and abnormal conditions (plot 2104). Therefore, the abnormal condition may be detected by monitoring the maximum amount of the rising magnetic waveform generated after the start of the solenoid valve operation (Max 1) and the maximum amount thereafter (Max 2). The difference as shown in plot 2106 may indicate a malfunctioning solenoid valve.

ADDITIONAL EXAMPLES AND NOTES

The following, non-limiting examples, detail certain aspects of the present subject matter to solve the challenges and provide the benefits discussed herein, among others.

Example 1 is an automated analyzer comprising: a solenoid valve comprising: a valve body defining a cavity, a plunger located at least partially within the cavity, and a wire coil located proximate a portion of the plunger; a sensor located proximate the coil; a processor in electrical communication with the sensor and the solenoid valve; and a memory storing instructions that, when executed by the processor, cause the processor to perform actions comprising: energizing the wire coil of the solenoid valve, receiving a signal from the sensor, the signal correlated to a magnetic flux proximate the solenoid valve, and determining a pre-failure status when the signal is outside a predetermined range.

In Example 2, the subject matter of Example 1 optionally includes wherein the signal is a voltage and the signal outside the predetermined range includes the voltage being below a preset voltage.

In Example 3, the subject matter of any one or more of Examples 1-2 optionally include wherein the actions further comprise: converting the signal into a waveform; and determining when the waveform deviates from a predefine waveform by the predetermined range.

In Example 4, the subject matter of any one or more of Examples 1-3 optionally include wherein the predetermined range is based on a type of the solenoid valve.

In Example 5, the subject matter of any one or more of Examples 1-4 optionally include wherein the sensor is a linear Hall effect sensor.

In Example 6, the subject matter of any one or more of Examples 1-5 optionally include wherein the sensor is one of a plurality of sensors and the solenoid valve is one of a plurality of solenoid valves.

In Example 7, the subject matter of any one or more of Examples 1-6 optionally include wherein the actions further comprise generating an indication of the pre-failure statues upon determining the pre-failure status.

In Example 8, the subject matter of any one or more of Examples 1-7 optionally include wherein the actions further comprise discontinuing an assay procedure after a predetermined time after determining the pre-failure status.

In Example 9, the subject matter of any one or more of Examples 1-8 optionally include wherein the actions further comprise initiating a self-diagnostic testing procedure upon determining the pre-failure status.

Example 10 is a system for controlling an automated analyzer, the system comprising: a processor; and a memory storing instructions that, when executed by the processor, cause the processor to perform actions comprising: transmitting a control signal to a solenoid valve of the automated analyzer, the control signal operative to actuate a solenoid valve of the automated analyzer, receiving an output signal from a sensor located proximate a coil of the solenoid valve, the output signal correlated to a magnetic flux proximate the coil of the solenoid valve, and determining a pre-failure status in response to discontinuing the assay procedure.

In Example 11, the subject matter of Example 10 optionally includes wherein the output signal is a voltage and the output signal outside the predetermined range includes the voltage being below a preset voltage.

In Example 12, the subject matter of any one or more of Examples 10-11 optionally include wherein the actions further comprise: converting the output signal into a waveform; and determining when the waveform deviates from a predefine waveform by the predetermined range.

In Example 13, the subject matter of any one or more of Examples 10-12 optionally include wherein the predetermined range is based on a type of the solenoid valve.

In Example 14, the subject matter of any one or more of Examples 10-13 optionally include wherein the sensor is a linear Hall effect sensor.

In Example 15, the subject matter of any one or more of Examples 10-14 optionally include wherein the system is a component of the automated analyzer.

In Example 16, the subject matter of any one or more of Examples 10-15 optionally include wherein the actions further comprise generating an indication of the pre-failure status upon determining the pre-failure status.

In Example 17, the subject matter of any one or more of Examples 10-16 optionally include wherein the actions further comprise discontinuing an assay procedure after a predetermined time after determining the pre-failure status.

In Example 18, the subject matter of any one or more of Examples 10-17 optionally include wherein the actions further comprise initiating a self-diagnostic testing procedure upon determining the pre-failure status.

Example 19 is a system for determining at least one parameter of a fluid sample, the system comprising: a solenoid valve comprising: a valve body; a plunger located at least partially within the valve body, the plunger movable between a first position and a second position, and a coil circumscribing at least a portion of the plunger, the coil arranged to magnetize the plunger when in an energized state; a sensor arranged proximate the coil, the sensor configured to: detect a variation of a magnetic field proximate the coil, and output an output signal; and a processor in electrical communication with the solenoid valve and the sensor, the processor operative to perform actions comprising determining when the output signal deviates from a threshold.

In Example 20, the subject matter of Example 19 optionally includes wherein the at least one sensor is a hall effect sensor.

In Example 21, the subject matter of Example 20 optionally includes wherein the at least one sensor of the sensor is a linear-hall effect sensor.

In Example 22, the subject matter of any one or more of Examples 19-21 optionally include wherein the at least one sensor is directly attached to the valve body.

In Example 23, the subject matter of any one or more of Examples 19-22 optionally include wherein when the output signal deviates from a threshold is based on at least a judgement logic.

In Example 24, the subject matter of any one or more of Examples 19-23 optionally include wherein an alert is able to be triggered when the output signal deviates by a threshold of at least a judgment logic.

In Example 25, the subject matter of Example 24 optionally includes wherein the alert is triggered by the judgement unit.

In Example 26, the subject matter of any one or more of Examples 24-25 optionally include wherein the alert is a solenoid valve failure alert and/or a solenoid valve replacement alert.

In Example 27, the subject matter of any one or more of Examples 19-26 optionally include wherein determining when the output signal deviates from the threshold comprises the processor comparing the output signal to a time difference between the first position and the second position of the plunger, the first position being a closed state and the second position being an open state.

In Example 28, the subject matter of any one or more of Examples 19-27 optionally include wherein determining when the output signal deviates from the threshold comprises the processor comparing the output signal to a time difference between the second position of the plunger, the second position being an open state.

In Example 29, the subject matter of any one or more of Examples 19-28 optionally include wherein determining when the output signal deviates from the threshold comprises the processor comparing the output signal to a decline time when plunger transitions to the first position, the first position being a closed state.

In Example 30, the subject matter of any one or more of Examples 19-29 optionally include wherein determining when the output signal deviates from the threshold comprises the processor comparing the output signal to a maximum value when the plunger is in the second state and an alternating current is supplied to create the energized state.

In Example 31, the subject matter of any one or more of Examples 19-30 optionally include wherein determining when the output signal deviates from the threshold comprises the processor comparing the output signal to a maximum value during a time period when the plunger is in the second position.

In Example 32, the subject matter of any one or more of Examples 19-31 optionally include wherein determining when the output signal deviates from the threshold comprises the processor comparing the output signal to a mean value when the plunger is in the second position.

In Example 33, the subject matter of any one or more of Examples 19-32 optionally include wherein determining when the output signal deviates from the threshold comprises the processor comparing the output signal to a mean value during a time period when the plunger is in the second position.

In Example 34, the subject matter of any one or more of Examples 19-33 optionally include wherein determining when the output signal deviates from the threshold comprises the processor comparing the output signal to a rising integral of the output signal.

In Example 35, the subject matter of any one or more of Examples 19-34 optionally include wherein determining when the output signal deviates from the threshold comprises the processor comparing the output signal to a decreasing integral of the output signal.

In Example 36, the subject matter of any one or more of Examples 19-35 optionally include wherein the actions further comprise generating an indication of the pre-failure status upon determining the pre-failure status.

In Example 37, the subject matter of any one or more of Examples 19-36 optionally include wherein the actions further comprise discontinuing an assay procedure after a predetermined time after determining the pre-failure status.

In Example 38, the subject matter of any one or more of Examples 19-37 optionally include wherein the actions further comprise initiating a self-diagnostic testing procedure upon determining the pre-failure status.

Example 39 is a method for controlling an automated analyzer having a solenoid valve, the method comprising: receiving, by a computing device, an output signal from a sensor located proximate a coil of the solenoid valve; determining, by the computing device, a variation of a magnetic field proximate the coil of the solenoid valve based on the output signal of the sensor; determining, by the computing device, a pre-failure status when the variation of the magnetic field is outside a predetermined range.

In Example 40, the subject matter of Example 39 optionally includes correlating the output signal to a magnetic flux of the magnetic field.

In Example 41, the subject matter of any one or more of Examples 39-40 optionally include converting the output signal into a waveform; and determining when the waveform deviates from a predefine waveform by the predetermined range.

In Example 42, the subject matter of any one or more of Examples 39-41 optionally include wherein the predetermined range is based on a type of the solenoid valve.

In Example 43, the subject matter of any one or more of Examples 39-42 optionally include wherein the sensor is a linear Hall effect sensor.

In Example 44, the subject matter of any one or more of Examples 39-43 optionally include wherein the sensor is a Hall effect sensor.

In Example 45, the subject matter of any one or more of Examples 39-44 optionally include wherein the sensor is one of a plurality of sensors and the solenoid valve is one of a plurality of solenoid valves of the automated analyzer.

In Example 46, the subject matter of any one or more of Examples 39-45 optionally include generating an indication upon determining the pre-failure status.

In Example 47, the subject matter of any one or more of Examples 39-46 optionally include discontinuing an assay procedure after a predetermined time after determining the pre-failure status.

In Example 48, the subject matter of any one or more of Examples 39-47 optionally include initiating a self-diagnostic testing procedure upon determining the pre-failure status.

In Example 49, the subject matter of any one or more of Examples 39-48 optionally include evaluating system integrity using a sample of know concentration after determining the pre-failure status.

In Example 50, the subject matter of any one or more of Examples 39-49 optionally include evaluating a fluid substance using the automated analyzer.

In Example 51, the subject matter of Example 50 optionally includes wherein the fluid substance comprises at least one of whole blood, serum, plasma, and saliva.

Example 52 is at least one computer-readable medium comprising instructions to perform any of the methods of Examples 39-51.

Example 53 is an apparatus comprising means for performing any of the methods of Examples 39-51.

In Example 54, the apparatuses or method of any one or any combination of Examples 1-53 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An automated analyzer comprising:
- a solenoid valve comprising:
  - a valve body defining a cavity,
  - a plunger located at least partially within the cavity, and
  - a wire coil located proximate a portion of the plunger;
- a sensor located proximate the wire coil;
- a processor in electrical communication with the sensor and the solenoid valve; and
- a memory storing instructions that, when executed by the processor, cause the processor to perform actions comprising:
  - energizing the wire coil of the solenoid valve,
  - receiving a signal from the sensor, the signal correlated to a magnetic flux proximate the solenoid valve, and
  - determining a pre-failure status when the signal is outside a predetermined range;
- wherein the actions further comprise:
  - converting the signal into a waveform;
  - determining when the waveform deviates from a predefined waveform by the predetermined range; and
  - based upon determining the pre-failure status, discontinuing an assay procedure which was ongoing at a time pre-failure status determination was made.

2. The automated analyzer of claim 1, wherein the signal is a voltage and the signal outside the predetermined range includes the voltage being below a preset voltage.

3. A system for controlling an automated analyzer, the system comprising:
- a processor; and
- a memory storing instructions that, when executed by the processor, cause the processor to perform actions comprising:
  - transmitting a control signal to a solenoid valve of the automated analyzer, the control signal operative to actuate the solenoid valve of the automated analyzer, receiving an output signal from a sensor located proximate a coil of the solenoid valve, the output signal correlated to a magnetic flux proximate the coil of the solenoid valve, determining a pre-failure status when the magnetic flux is outside a predetermined value, and generating an indication of the pre-failure status upon determining the pre-failure status;

wherein the actions further comprise:

converting the output signal into a waveform;

determining when the waveform deviates from a predefined waveform by the predetermined range; and initiating a self diagnostic testing procedure upon determining the pre-failure status, wherein the self-diagnostic testing procedure comprises flowing a fluid through the automated analyzer.

4. The system of claim 3, wherein the output signal is a voltage and the output signal outside the predetermined range includes the voltage being below a preset voltage.

5. The system of claim 3, wherein:

the system is a component of the automated analyzer; and the automated analyzer is an automated fluid analyzer adapted to determining parameters of fluid samples through performing assays.

6. A system for determining at least one parameter of a fluid sample, the system comprising:

a plurality of solenoid valves, wherein each solenoid valve from the plurality of solenoid valves comprises:

a valve body;

a plunger located at least partially within the valve body, the plunger movable between a first position and a second position, and a coil circumscribing at least a portion of the plunger, the coil arranged to magnetize the plunger when in an energized state;

a plurality of sensors, wherein each sensor from the plurality of sensors has a corresponding solenoid valve from the plurality of solenoid valves, and wherein each sensor from the plurality of sensors:

is arranged proximate the coil of that sensor's corresponding solenoid valve, and is configured to:

detect a variation of a magnetic field proximate the coil of that sensor's corresponding solenoid valve, and output an output signal; and a processor in electrical communication with each solenoid valve of the plurality of solenoid valves and each sensor from the plurality of sensors, the processor operative to perform actions comprising determining, for each sensor from the plurality of sensors when the output signal from that sensor deviates from a threshold for that sensor;

wherein:

for each sensor from the plurality of sensors, determining when the output signal from that sensor deviates from the threshold for that sensor comprises evaluating a judgment logic for that sensor, wherein the judgment logic for that sensor comprises the threshold for that sensor;

the plurality of sensors comprises a first sensor and a second sensor;

the judgment logic for the first sensor is different from the judgment logic for the second sensor; and the actions the processor is operative to perform comprise, for each sensor from the plurality of sensors, triggering an alert when the output signal from that sensor deviates from the threshold for that sensor based on the judgment logic of that sensor.

7. The system of claim 6, wherein at least one sensor of the plurality of sensors is a linear hall effect sensor.

8. The system of claim 6, wherein determining when the output signal deviates from the threshold comprises: the processor comparing the output signal to a time difference between the first position and the second position of the plunger, the first position being a closed state and the second position being an open state; or the processor comparing the output signal to a time difference between the second position of the plunger, the second position being an open state.

9. The system of claim 6, wherein determining when the output signal deviates from the threshold comprises:

the processor comparing the output signal to a decline time when the plunger transitions to the first position, the first position being a closed state;

the processor comparing the output signal to a maximum value when the plunger is in the second state and an alternating current is supplied to create the energized state;

the processor comparing the output signal to a maximum value during a time period when the plunger is in the second position;

the processor comparing the output signal to a mean value when the plunger is in the second position; or the processor comparing the output signal to a mean value during a time period when the plunger is in the second position.

10. The system of claim 6, wherein determining when the output signal deviates from the threshold comprises: the processor comparing the output signal to a rising integral of the output signal; or the processor comparing the output signal to a decreasing integral of the output signal.

11. The system of claim 6, wherein the actions further comprise initiating a self-diagnostic testing procedure upon determining the pre-failure status.

12. A method for controlling an automated analyzer having a solenoid valve, the method comprising:

generating a magnetic field proximate a coil of the solenoid valve by energizing the coil of the solenoid valve;

receiving, by a computing device, an output signal from a sensor located proximate the coil of the solenoid valve;

determining, by the computing device, a variation of the magnetic field proximate the coil of the solenoid valve while the coil of the solenoid valve is energized based on the output signal of the sensor;

determining, by the computing device, a pre-failure status when the variation of the magnetic field is outside a predetermined range;

wherein:

the sensor is one of a plurality of sensors, wherein at least one of the plurality of sensors is a linear Hall effect sensor; and the solenoid valve is one of a plurality of solenoid valves of the automated analyzer, wherein each solenoid valve from the plurality of solenoid valves has a corresponding sensor from the plurality of sensors.

13. The method of claim 12, further comprising:

correlating the output signal to a magnetic flux of the magnetic field; or converting the output signal into a waveform; and determining when the waveform deviates from a predefined waveform by the predetermined range.

14. The method of claim 12, further comprising:
generating an indication upon determining the pre-failure status;
discontinuing an assay procedure after a predetermined time after determining the pre-failure status;
initiating a self-diagnostic testing procedure upon determining the pre-failure status; and
either:
evaluating system integrity using a sample of known concentration after determining the pre-failure status; or
evaluating a fluid substance using the automated analyzer.

15. At least one non-transitory computer-readable medium comprising instructions to perform the method of claim 12.

16. An apparatus comprising:
a processor; and
a non-transitory computer readable medium having stored thereon instructions for configuring the processor to perform the method of claim 12.

* * * * *